US011908387B1

United States Patent

Wong et al.

(10) Patent No.: US 11,908,387 B1

(45) Date of Patent: Feb. 20, 2024

(54) DISPLAY BACKPLANE WITH SHARED DRIVERS FOR LIGHT SOURCE DEVICES

(71) Applicants: Syndiant Inc., Dallas, TX (US); XDMicro (Zhongshan) Optoelectronics Semiconductor, Zhongshan (CN)

(72) Inventors: Chun Chiu Daniel Wong, Palo Alto, CA (US); Craig Michael Waller, Dallas, TX (US)

(73) Assignees: Syndiant, Inc., Dallas, TX (US); XDMicro (Zhongshan) Optoelectronics Semiconductor Co., LTD, Zhongshan (CN)

( * ) Notice: Subject to any disclaimer, the term of this patent is extended or adjusted under 35 U.S.C. 154(b) by 0 days.

(21) Appl. No.: 17/981,987

(22) Filed: Nov. 7, 2022

(51) Int. Cl.
*G09G 3/32* (2016.01)
*G09G 3/3208* (2016.01)

(52) U.S. Cl.
CPC ............. *G09G 3/32* (2013.01); *G09G 3/3208* (2013.01); *G09G 2300/0452* (2013.01)

(58) Field of Classification Search
None
See application file for complete search history.

(56) References Cited

U.S. PATENT DOCUMENTS

| | | | | |
|---|---|---|---|---|
| 2016/0042695 | A1* | 2/2016 | Park | G09G 3/3648 345/690 |
| 2016/0189600 | A1* | 6/2016 | Shin | G09G 3/3688 345/212 |
| 2019/0147786 | A1* | 5/2019 | Kim | H10K 59/35 345/690 |
| 2019/0180700 | A1* | 6/2019 | Gu | G09G 3/3426 |
| 2019/0229234 | A1* | 7/2019 | Zou | H01L 33/42 |
| 2019/0371232 | A1* | 12/2019 | Kim | G09G 3/2011 |
| 2020/0302841 | A1* | 9/2020 | Jung | G09G 3/3275 |

* cited by examiner

*Primary Examiner* — Patrick N Edouard
*Assistant Examiner* — Peijie Shen
(74) *Attorney, Agent, or Firm* — Edward S. Mao

(57) ABSTRACT

A display with multiple light sources sharing a device driver is disclosed. In one embodiment of the present invention a display includes a first device driver, a first light source, a second light source and a first light-source selection circuit which is coupled to the first device driver, the first light source and the second light source. The first light-source selection circuit is configured to pair the first device driver with the first light source during a first time interval and to pair the first device driver with the second light source in a second time interval.

23 Claims, 14 Drawing Sheets

DISPLAY BACKPLANE WITH SHARED DRIVERS FOR LIGHT SOURCE DEVICES

BACKGROUND OF THE INVENTION

Field of the Invention

The present invention relates to display technology. More specifically, the present invention relates to methods and systems of device drivers driving light sources.

Discussion of Related Art

Modern emissive displays typically include a backplane that contains the picture processing circuits and the pixel control circuits. The backplane can also include or be attached to device drivers and light sources, which are driven by the device drivers. Light sources can include, light emitting diodes (LED), micro LED, organic LEDs, fluorescent/plasma devices, field emissive devices, and others.

FIG. 1 shows a small portion of a conventional display 100. Specifically, FIG. 1 only shows 6 light sources and six device drivers of display 100. Generally, a display would have thousands of light sources and an equal number of device drivers. In FIG. 1, a backplane 110 supports device drivers DD_1, DD_2, DD_3, DD_4, DD_5, and DD_6. Above the device drivers are pixel light sources LS_1, LS_2, LS_3, LS_4, LS_5, and LS_6. Each device driver DD_X is coupled to and controls light source LS_X. Thus, light source LS_1 is coupled to and controlled by device driver DD_1. Similarly, light sources LS_2, LS_3, LS_4, LS_5, and LS_6, are coupled to and controlled by device drivers DD_2, DD_3, DD_4, DD_5, and DD_6, respectively.

FIG. 1 is a logic diagram rather than a physical layout of display 100. Thus, even though light sources LS_1, LS_2, LS_3, LS_4, LS_5, and LS_6 appear in a row in FIG. 1, in the actual display they could have different physical layouts depending on the specific way the light sources are being used. For example, light sources LS_1, LS_2, and LS_3, could be a red, green and blue micro LED, respectively, which are used in combination as a single pixel of the display. In this case light sources LS_1, LS_2, and LS_3 would likely be arranged in a roughly square shape.

Backplane 110 would also include various, logic circuits to support the operation of the device drivers. For clarity these logic circuits are omitted in the figures because the omitted logic circuits, which are well known in the art, are not an integral aspect of the present invention.

The transition from standard definition video to high definition video and beyond has created a great demand for higher resolution displays. However, for many displays the size of the device drivers is becoming a limiting factor for the density of pixels in a display. Thus, to create higher resolution displays using conventional techniques, the overall size of the display must be increased. However, increasing the size of the display would also increase the cost and power consumption. Hence there is a need for a method or system create high resolution displays.

SUMMARY

Accordingly, the present invention provides a novel high resolution displays by having multiple light sources share a device driver. Each light source is paired with the device driver at different time intervals. Specifically, in some embodiments of the present invention a display includes a first device driver, a first light source, a second light source and a first light-source selection circuit which is coupled to the first device driver, the first light source and the second light source. The first light-source selection circuit is configured to pair the first device driver with the first light source during a first time interval and to pair the first device driver with the second light source in a second time interval.

Furthermore, in some embodiment of the present invention, the display includes a third light source coupled to the first light-source selection circuit and the first light-source configuration circuit is configured to pair the first device driver with the third light source during a third time interval. In some embodiments the first time interval, the second time interval, and the third time interval are sub-periods of a frame time period. In addition in some displays the first light source is a first color, the second light source is a second color, and the third light source is a third color.

In some embodiments of the present invention all light sources of one color are paired to device drivers in the same time interval. These embodiments behave as field sequential color display. In other embodiments of the present invention, different color light sources can be paired to device drivers in the same time interval.

The present invention will be more fully understood in view of the following description and drawings.

DETAILED DESCRIPTION

As explained above, the resolution of conventional displays may be limited by the size of the device drivers. However displays in accordance with embodiments of the present use share device drivers with multiple light sources. Thus, displays in accordance with the present invention can have more light sources than device drivers to obtain higher resolution than conventional displays.

Figure 1:
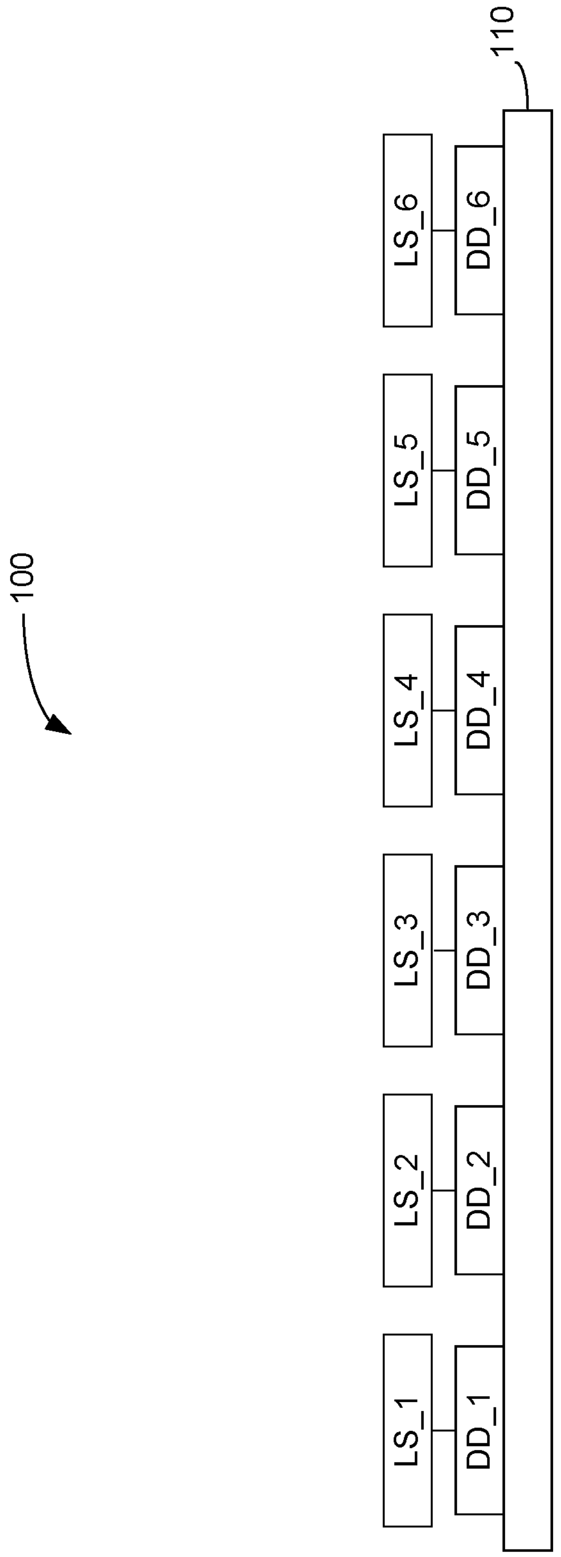
FIG. 1 (Prior Art)
FIG. 1 illustrate a portion of a conventional emissive display.
Figure 2:
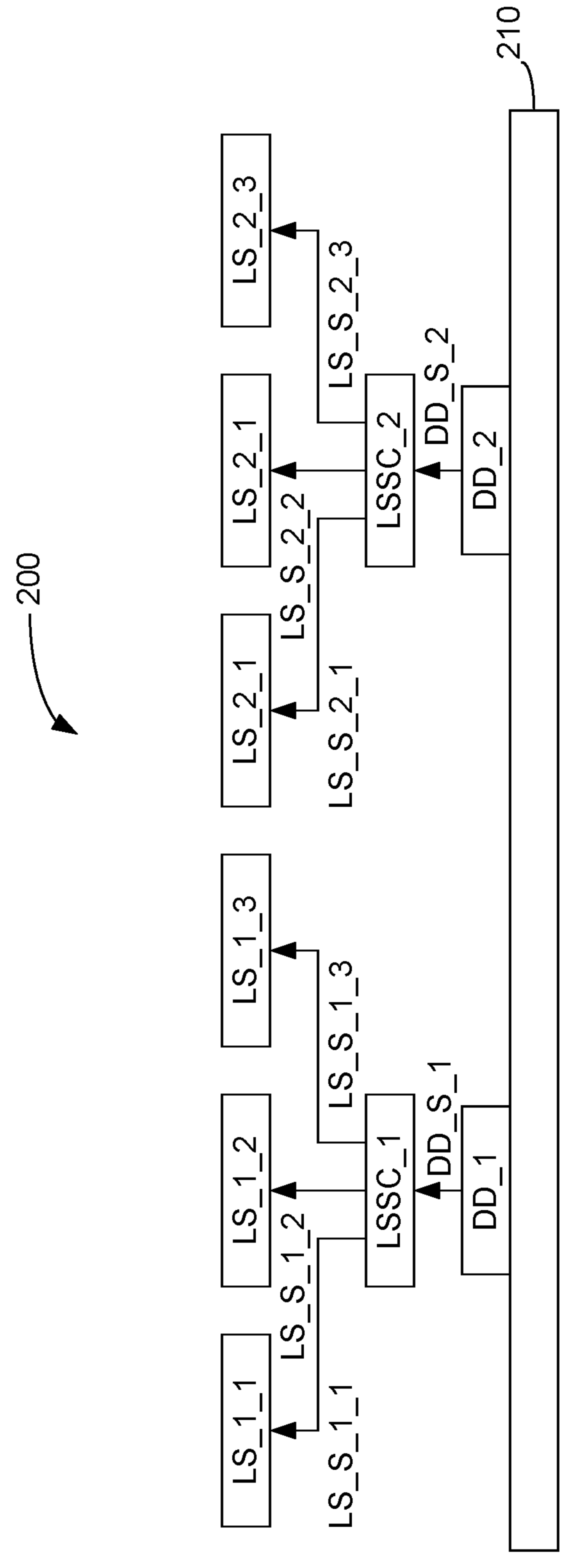
FIG. 2 is an illustration of a portion of display in accordance with one embodiment of the present invention.

FIG. 2 shows a small portion of a display 200 in accordance with one embodiment of the present invention. As illustrated in FIG. 2, display 200 includes a backplane 210, device drivers DD_1 and DD_2, light-source selection circuits LSSC_1 and LSSC_2, and light sources LS_1_1, LS_1_2, LS_1_3, LS_2_1, LS_2_2, and LS_2_3. Each of the light-source selection circuits pairs a device driver with a light source by passing the corresponding device driver signal as the corresponding light source signal during a time interval. The time interval can be a frame time update period, a sub-period of a frame time update period, or multiple frame time update periods.

Specifically, Light-source selection circuit LSSC_1 selectively couples device driver DD_1 to light sources LS_1_1, LS_1_2, or LS_1_3. Specifically, device driver DD_1 provides a device driver signal DD_S_1 to light-source selection circuit LSSC_1. Light-source selection circuit LSSC_1 provides light source signal LS_S_1_1 to light source LS_1_1, light source signal LS_S_1_2 to light source LS_1_2, and light source signal LS_S_1_3 to light source LS_1_3. Similarly, light-source selection circuit LSSC_2 selectively couples device driver DD_2 to light sources LS_2_1, LS_2_2, and LS_2_3. Specifically, device driver DD_2 provides a device driver signal DD_S_2 to light-source selection circuit LSSC_2. Light-source selection circuit LSSC_2 provides light source signal LS_S_2_1 to light source LS_2_1, light source signal LS_S_2_2 to light source LS_2_2, and light source signal LS_S_2_3 to light source LS_2_3. Generally, each of the light-source selection circuits passes the device driver signal to only one of the light sources at a time. At high enough frequencies the human eye would not discern that the light sources are turning on and off. The embodiment of FIG. 2 uses a digital pulse width modulation scheme to control the intensity of each light source during the frame time period. Specifically, each light source is either on or off. For higher intensities the light source remains on for a large amount of time during frame time period FT and for lower intensities the light source is on for a shorter amount of time during frame time period FT. In display 200 each light source is controlled by the corresponding light source signal from the light-source selection circuit, which in turn is provided the device driving signal from the device driver.

Figure 3:
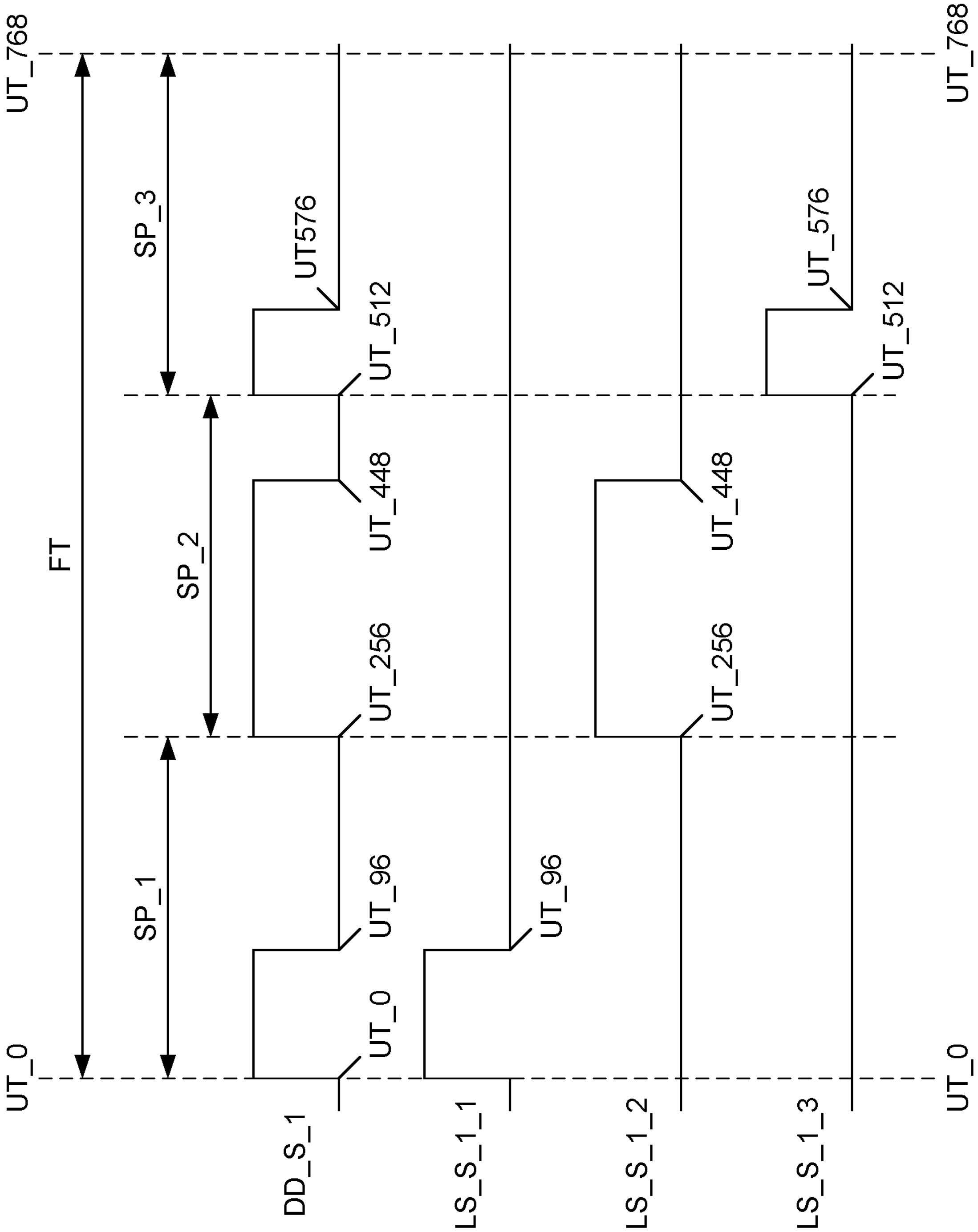
FIG. 3 is timing diagram illustrating the operation of a display in accordance with one embodiment of the present invention.

FIG. 3 shows a timing diagram that can be used for display 200 in accordance with one embodiment of the present invention. Specifically FIG. 3 shows one frame time period FT, in which one frame of a video is shown on the display. The frame time period is divided into a number of update times (UT) when signals can change from one logic state to another. The number of update times can vary between different embodiments of the present invention. In the embodiment of FIG. 3 frame time period FT is divided into 768 possible update times. As shown in FIG. 3, device driver signal DD_S_1 transitions to logic high at update time UT_0, transitions to logic low at update time UT_96, transitions to logic high at update time UT_256, transitions to logic low at update time UT_448, transitions to logic high at update time UT_512, and transitions to logic low at update time UT_576.

Frame time period FT is divided into sub-periods SP_1, SP_2, and SP_3. Sub-period SP_1 covers update time UT_0 to update time UT_256. Sub-period SP_2 covers update time UT_256 to update time UT_512. Sub-Period SP_3 covers update time UT_512 to update time UT_768. During sub-period SP_1, light source selecting circuit LSSC_1 pairs device driver DD_1 with light source LS_1_1 so that device driver DD_1 drive light source LS_1_1. During sub-period SP_2, light source selecting circuit LSSC_1 is configured to pair light source LS_1_2 with device driver DD_1 so that device driver DD_1 drives light source LS_1_2. During sub-periods SP_3, light source selecting circuit is configured to pair light source LS_1_3 with device driver DD_1 so that device driver DD_1 drives light source LS_1_3. Thus during sub-period SP_1, light source signal LS_S_1_1 should be a copy of device driver signal DD_S_1, light source signal LS_S_1_2 should remain at logic low, and light source signal LS_S_1_3 should also remain at logic low. During sub-period SP_2, light source signal LS_S_1_1 should remain logic low, light source signal LS_S_1_2 should be a copy of device driver signal DD_S_1, and light source signal LS_S_1_3 should also remain at logic low. During sub-period SP_3, light source signal LS_S_1_1 should remain logic low, light source signal LS_S_1_2 should also remain at logic low, and light source signal LS_S_1_3 should be a copy of device driver signal DD_S_1.

Accordingly, during sub-period SP_1, light source signal LS_S_1_1 transitions to logic high at update time UT_0 and transitions to logic low at update time UT_96. Light source signal LS_S_1_1 remains at logic low during sub-periods SP_2 and SP_3. During sub-period SP_1, light source signal LS_S_1_2 remains at logic low. During sub-period SP_2, light source signal LS_S_1_2 transitions to logic high at update time UT_256 and transitions to logic low at update time UT_448. During sub-period SP_3, light source signal LS_S_1_2 remains at logic low. During sub-periods SP_1 and SP_2, light source signal LS_S_1_3 remains at logic low but during sub-period SP_3, light source signal LS_S_1_3 transitions to logic high at update time UT_512 and transitions during to logic low at update time UT_576.

When display 200 is used with the timing diagram of FIG. 3, Light source LS_1_1 would be turned on between update time UT_0 and UT_96. Thus, light source LS_1_1 is turned on for a total of 96 update times. Light source LS_1_2 would be turned on between update time UT_256 and UT_448. Thus, light source LS_1_2 is turned on for a total of 192 update times. Light source LS_1_3 would be turned on between update time UT_512 and UT_576. Thus, light source LS_1_3 is turned on for a total of 64 update times.

In one configuration of display 200 in accordance with one embodiment of the present invention, light sources LS_1_1, LS_1_2, and LS_1_3, are different colors. The three light sources are color components of a single pixel. For example, light source LS_1_1 can be a red sub-pixel, light source LS_1_2 can be a green sub-pixel, and light source LS_1_3, can be a blue color sub-pixel. Other pixels are formed similarly, for example, light sources LS_2_1, LS_2_2, and LS_2_3 are the red, green, and blue sub-pixels of a second pixel driven by device driver DD_2. If the same color component of each pixel is configured to be active in the same sub-period of a frame update period, the display would behave as a field sequential color display.

However, other embodiments of the present invention may choose to have different color components of different pixels active during the same sub-period. Specifically, a display in accordance with one embodiment of the present invention has a first set of pixels in which the first color component is active in the first sub-period, the second color component is active in the second sub-period, and the third color component is active in the third sub-period. The display also has a second set of pixels in which the first color component is active in the second sub-period, the second color component is active in the third sub-period, and the third color component is active in the first sub-period. In addition, the display has a third set of pixels in which the first color component is active in the third sub-period, the second color component is active in the first sub-period, and the third color component is active in the second sub-period. Each set of pixels should be distributed across the display.

Figure 4:
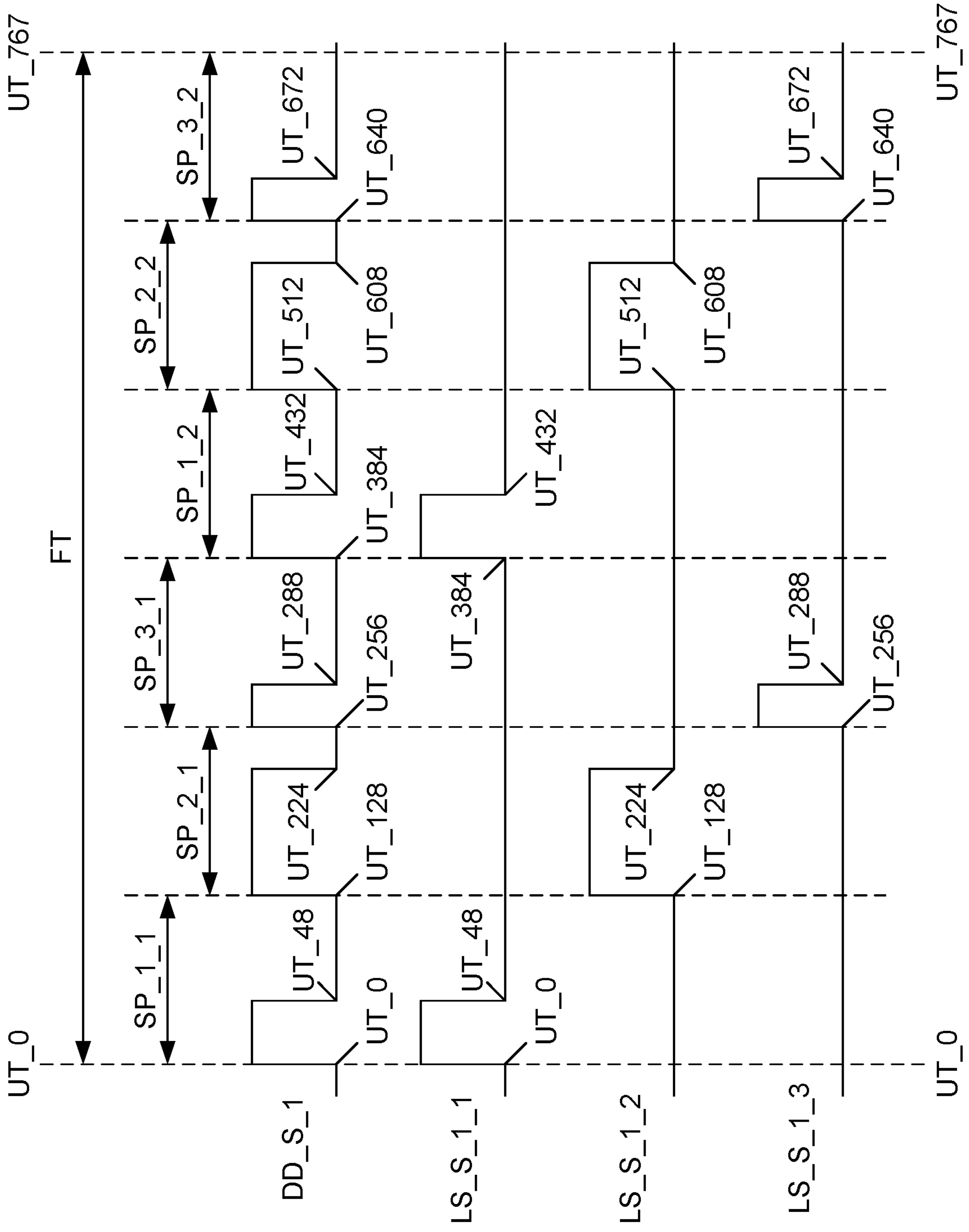
FIG. 4 is timing diagram illustrating the operation of a display in accordance with one embodiment of the present invention.

FIG. 4 shows another timing diagram that can be used with display 200 in accordance with one embodiment of the present invention. Like FIG. 3, FIG. 4 shows one frame time period FT, which is divided into 768 possible update times. However, the frame time period is divided into 6 sub periods, SP_1_1, SP_2_1, SP_3_1, SP_1_2, SP_2_2, and SP_3_2. The timing diagram in FIG. 4 will produce nearly the same image as the timing diagram of FIG. 3; however, the timing is modified so that each light source is allowed two smaller sub-periods instead of a single sub-period to be active. In certain circumstances, the timing diagram of FIG. 4 may produce a better image than the timing diagram of FIG. 3 for certain people, especially those susceptible to flicker.

In FIG. 4, Sub-period SP_1_1, which is used for light source LS_1_1, covers update time UT_0 to update time UT_128. Sub-period SP_2_1, which is used for light source LS_1_2 covers update time UT_128 to update time UT_256. Sub-period SP_3_1, which is used for light source LS_1_3, covers update time UT_256 to update time UT_384 Sub-period SP_1_2, which is used for light source LS_1_1, covers update time UT_384 to update time UT_432. Sub-period SP_2_1, which is used for light source LS_1_2, covers update time UT_432 to update time UT_512. Sub-period SP_3_1, which is used for light source LS_1_3, covers update time UT_640 to update time UT_768.

As shown in FIG. 4, device driver signal DD_S_1 transitions to logic high at update time UT_0, transitions to logic low at update time UT_48, transitions to logic high at update time UT_128, transitions to logic low at update time UT_224, transitions to logic high at update time UT_256, transitions to logic low at update time UT_288, transitions to logic high at update time UT_384, transitions to logic low at update time UT_432, transitions to logic high at update time UT_512, transitions to logic low at update time UT_608, transitions to logic high at update time UT_640, and transitions to logic low at update time UT_672.

Accordingly, during sub-period SP_1_1, light source signal LS_S_1_1 transitions to logic high at update time UT_0 and transitions to logic low at update time UT_48. Light source signal LS_S_1_1 remains at logic low during sub-periods SP_2_1 and SP_3_1. Then during sub-period SP_1_2, light source signal LS_S_1_1 transitions to logic high at update time UT_384 and transitions to logic low at update time UT_432. Light source signal LS_S_1_1 remains at logic low during sub-periods SP_2_2 and SP_3_2.

During sub-period SP_1_1, light source signal LS_S_1_2 remains at logic low. During sub-period SP_2_1, light source signal LS_S_1_2 transitions to logic high at update time UT_128 and transitions to logic low at update time UT_224. During sub-period SP_3_1 and SP_1_2, light source signal LS_S_1_2 remains at logic low. Then during sub-period SP_2_2, light source signal LS_S_1_2 transitions to logic high at update time UT_512 and transitions to logic low at update time UT_608. Light source signal LS_S_1_2 remains at logic low during sub-period SP_3_2.

During sub-periods SP_1 and SP_2, light source signal LS_S_1_3 remains at logic low. During sub-period SP_3, light source signal LS_S_1_3 transitions to logic high at update time UT_256 and transitions during to logic low at update time UT_288. Light source signal LS_S_1_3 remains at logic low during sub-periods SP_1_2 and SP_2_2. Then during sub period SP_3_2, light source signal LS_S_1_3 transitions to logic high at update time UT_640 and transitions during to logic low at update time UT_672.

When display 200 is used with the timing diagram of FIG. 4, Light source LS_1_1 is turned on between update times UT_0 and UT_48 and between update times UT_384 and UT_432. Thus, light source LS_1_1 is turned on for a total of 96 update times. Light source LS_1_2 is turned on between update time UT_128 and UT_224 and between update times UT_512 and UT_608. Thus, light source LS_1_2 is turned on for a total of 192 update times. Light source LS_1_3 is turned on between update times UT_512 and UT_576 and between update times UT_640 and UT_672. Thus, light source LS_1_3 is turned on for a total of 64 update times. Therefore, light source LS_1_1, LS_1_2, and LS_1_3 using the timing diagram of FIG. 3 are on the same amount of update times as they would be using the timing diagram of FIG. 4. Most people would not perceive a difference between using the timing diagram of FIG. 3 or FIG. 4; however those with high flicker sensitivity may perceive the images from the timing diagram of FIG. 4 to be of higher quality. Although both FIG. 3 and FIG. 4 shows each light source is paired with the device driver for the same amount of time, some embodiments of the present invention may pair some light sources with the device driver longer than other light sources. For example, if a blue light source is not as bright as the green and red light sources, the blue light source may be paired longer with the device driver to compensate. In this case, the timing diagrams of FIG. 3 and FIG. 4 could be modified by making the sub-periods for the blue light source longer than the other sub-periods.

Figure 5:
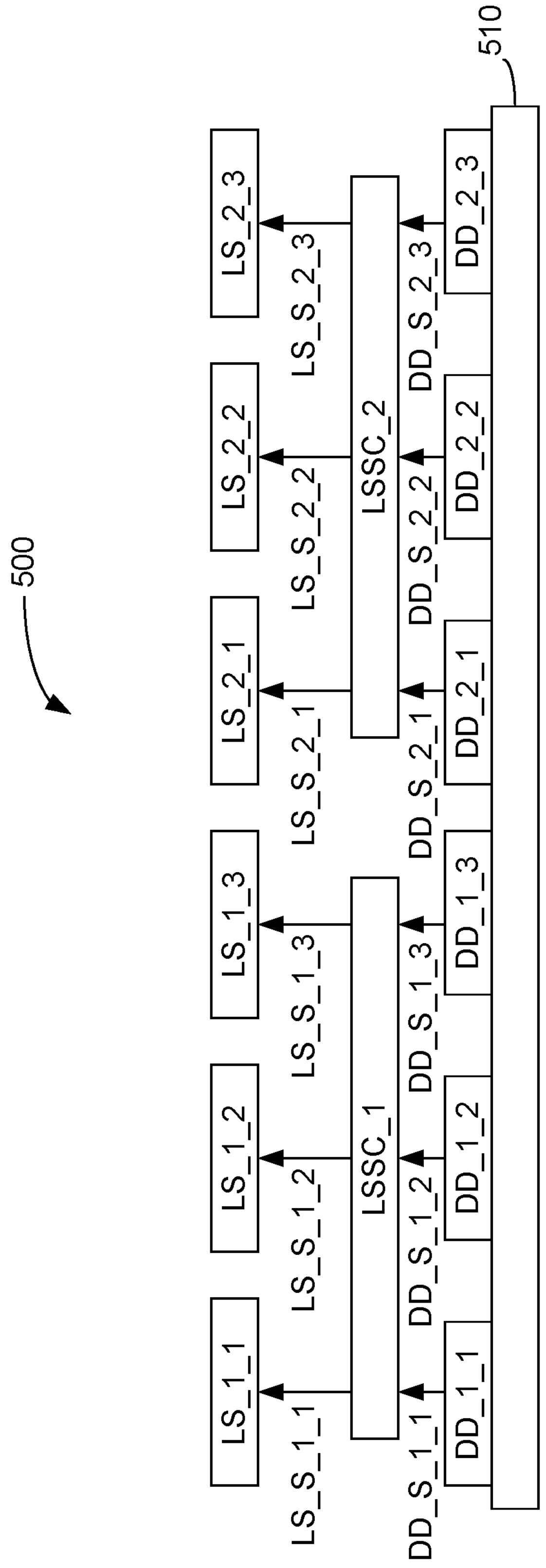
FIG. 5 is an illustration of a portion of display in accordance with one embodiment of the present invention.

FIG. 5 shows a small portion of a display 500 in accordance with one embodiment of the present invention. As illustrated in FIG. 5, display 500 includes a backplane 510, device drivers DD_1_1, DD_1_2, DD_1_3, DD_2_1, DD_2_2, and DD_2_3, light-source selection circuits LSSC_1 and LSSC_2, and light sources LS_1_1, LS_1_2, LS_1_3, LS_2_1, LS_2_2, and LS_2_3. Light-source selection circuit LSSC_1 selectively pairs device drivers DD_1_1, DD_1_2, and DD_1_3 to light sources LS_1_1, LS_1_2, and LS_1_3. Specifically, device drivers DD_1_1, DD_1_2, and DD_1_3 provide device driver signals DD_S_1_1, DD_S_1_2, and DD_S_1_3, respectively to light-source selection circuit LSSC_1. Light-source selection circuit LSSC_1 provides light source signal LS_S_1_1 to light source LS_1_1, light source signal LS_S_1_2 to light source LS_1_2, and light source signal LS_S_1_3 to light source LS_1_3. Similarly, light-source selection circuit LSSC_2 selectively pairs device drivers DD_2_1, DD_2_2, and DD_2_3 to light sources LS_2_1, LS_2_2, and LS_2_3. Specifically, device drivers DD_2_1, DD_2_2, and DD_2_3 provide device driver signals DD_S_2_1, DD_S_2_2, and DD_S_2_3, respectively, to light-source selection circuit LSSC_2. Light-source selection circuit LSSC_2 provides light source signal LS_S_2_1 to light source LS_2_1, light source signal LS_S_2_2 to light source LS_2_2, and light source signal LS_S_2_3 to light source LS_2_3.

In display 500, each of the light-source selection circuits pairs a device driver with a light source by passing the corresponding device driver signal as the corresponding light source signal during a time interval such as a frame time update period. During the next time interval, a different light source is paired with each device driver. Generally, the pairing would follow a fixed pattern the simplest being a sequential order. In addition, each device driver may be paired to each light source for about the same amount of time. However, some embodiments of the present invention may use random pairing of the device drivers and light sources or asymmetrical pairing schemes.

This manner of pairing device drivers with different light sources can mitigate issues caused when the device drivers are not completely identical. For example if a faulty device driver has higher power output, the light source coupled to that device driver may be brighter than intended. By having the faulty device control multiple light sources (although only one at a time) the extra brightness is diffused among the different light sources. Similarly, a faulty device driver that has a lower power output would result in a light source that is dimmer than intended. Again by changing which light source is dimmer each frame update time, the dimmer light source is diffused and would not be as noticeable.

Figure 6:
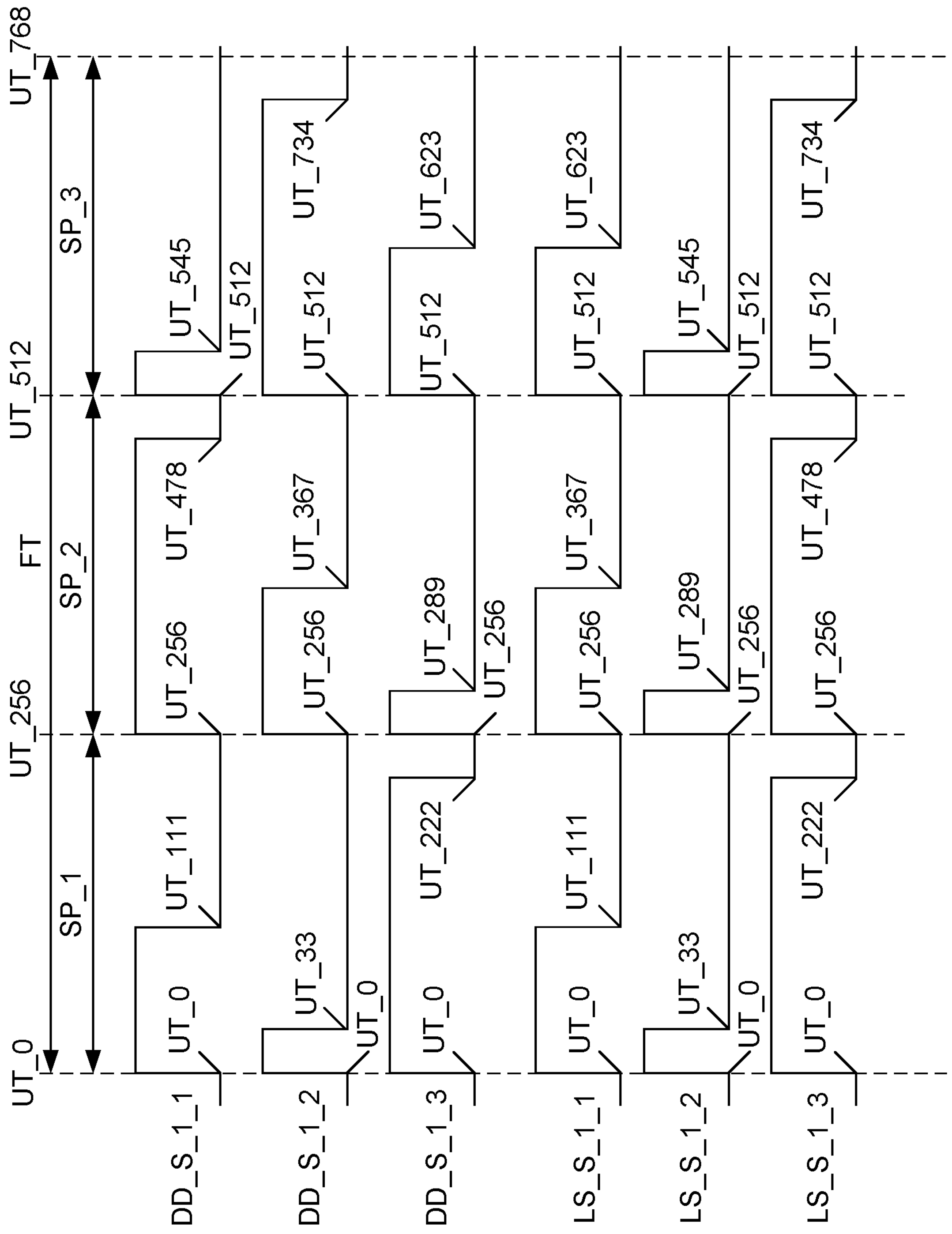
FIG. 6 is timing diagram illustrating the operation of a display in accordance with one embodiment of the present invention.

FIG. 6 shows a timing diagram that can be used for display 500 in accordance with one embodiment of the present invention. Specifically FIG. 6 shows three sub-periods (SP_1, SP_2, and SP_3) of frame time period FT having 768 update times. In the embodiment of FIG. 6 each frame time sub-period is divided into 256 possible update times. In FIG. 6, during sub-period SP_1, device driver signal DD_S_1_1 transitions to logic high at update time UT_0 and transitions to logic low at update time UT_111. During sub-period SP_2, device driver signal DD_S_1_1 transitions to logic high at update time UT_256 and transitions to logic low at update time UT_478. During sub-period SP_3, device driver signal DD_S_1_1 transitions to logic high at update time UT_512 and transitions to logic low at update time UT_545. Device driver signal DD_S_1_2 transitions to logic high at update time UT_0 and transitions to logic low at update time UT_33 during sub-period SP_1; transitions to logic high at update time UT_256 and transitions to logic low at update time UT_367 during sub-period SP_2; and transitions to logic high at update time UT_512 and transitions to logic low at update time UT_734 during sub-period SP_3. Device driver signal DD_S_1_3 transitions to logic high at update time UT_0 and transitions to logic low at update time UT_222 during sub-period SP_1; transitions to logic high at update time UT_256 and transitions to logic low at update time UT_289 during sub-period SP_2; and transitions to logic high at update time UT_512 and transitions to logic low at update time UT_623 during sub-period SP_3.

During sub-period SP_1, light-source selection circuit LSSC_1 pairs light source LS_1_1 with data driver DD_1_1, light source LS_1_2 with data driver DD_1_2, and light source LS_1_3 with data driver DD_1_3. Thus as shown in FIG. 6, during sub-period SP_1, light source signal LS_S_1_1 transitions to logic high at update time UT_0 and transitions to logic low at update time UT_111 just as device driver signal DD_S_1_1; light source signal LS_S_1_2 transitions to logic high at update time UT_0 and transitions to logic low at update time UT_33 just as device driver signal DD_S_1_2; and light source signal LS_S_1_3 transitions to logic high at update time UT_0 and transitions to logic low at update time UT_222 just as device driver signal DD_S_1_3.

During sub-period SP_2, light-source selection circuit LSSC_1 pairs light source LS_1_1 with data driver DD_1_2, light source LS_1_2 with data driver DD_1_3, and light source LS_1_3 with data driver DD_1_1. Thus as shown in FIG. 6, during sub-periods SP_2, light source signal LS_S_1_1 transitions to logic high at update time UT_256 and transitions to logic low at update time UT_367 just as device driver signal DD_S_1_2; light source signal LS_S_1_2 transitions to logic high at update time UT_256 and transitions to logic low at update time UT_289 just as device driver signal DD_S_1_3; and light source signal LS_S_1_3 transitions to logic high at update time UT_256 and transitions to logic low at update time UT_478 just as device driver signal DD_S_1_1.

During sub-period SP_3, light-source selection circuit LSSC_1 pairs light source LS_1_1 with data driver DD_1_3, light source LS_1_2 with data driver DD_1_1, and light source LS_1_3 with data driver DD_1_2. Thus as shown in FIG. 6, during sub-period SP_3, light source signal LS_S_1_1 transitions to logic high at update time UT_512 and transitions to logic low at update time UT_623 just as device driver signal DD_S_1_3; light source signal LS_S_1_2 transitions to logic high at update time UT_512 and transitions to logic low at update time UT_545 just as device driver signal DD_S_1_1; and light source signal LS_S_1_3 transitions to logic high at update time UT_512 and transitions to logic low at update time UT_734 just as device driver signal DD_S_1_2.

This pattern can continue repeatedly so that in frame time period FT_4 (not shown) light-source selection circuit LSSC_1 pairs light source LS_1_1 with data driver DD_1_1, light source LS_1_2 with data driver DD_1_2, and light source LS_1_3 with data driver DD_1_3, which is the same pairing as during frame time period FT_1. However other embodiments of the present invention can use other pairing schemes. Furthermore, the time interval of pairing shown in FIG. 6 is one third of a frame time period. However other embodiments of the present invention can use different time interval of pairings. For example some embodiments of the present invention may use a full frame time as the time interval, or multiple sub-periods in a frame time period like in FIG. 4. Still other embodiments of the present invention may keep the same device driver/light source pairing for multiple time intervals before switching. In some embodiments of the present invention based on FIG. 5, light sources LS_1_1, LS_1_2, and LS_1_3 are different color components of the same pixel. In other embodiments light sources LS_1_1, LS_1_2, and LS_1_3 are parts of different pixels.

Figure 7:
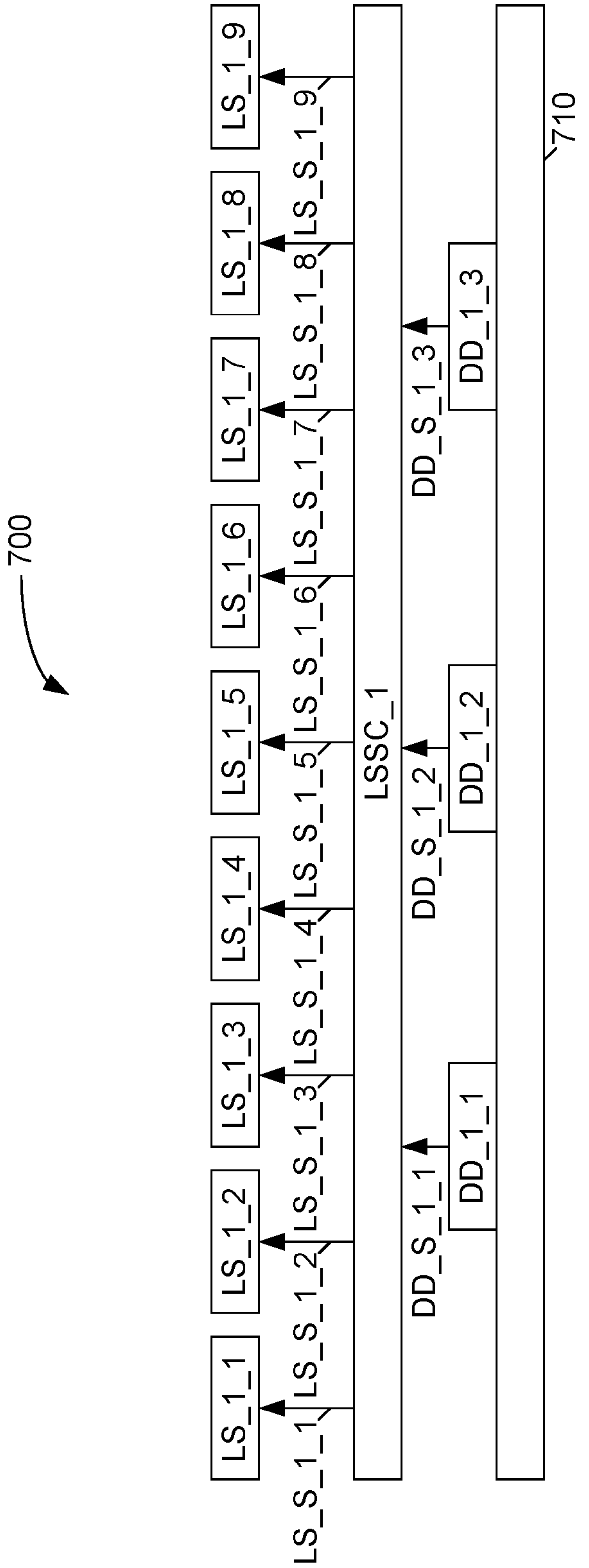
FIG. 7 is an illustration of a portion of display in accordance with one embodiment of the present invention.

FIG. 7 shows a small portion of a display 700 in accordance with one embodiment of the present invention. As illustrated in FIG. 7, display 700 includes a backplane 710, device drivers DD_1_1, DD_1_2, and DD_1_3; light-source selection circuit LSSC_1; and light sources LS_1_1, LS_1_2, LS_1_3, LS_1_4, LS_1_5, LS_1_6, LS_1_7, LS_1_8, and LS_1_9. Light-source selection circuit LSSC_1 selectively pairs device drivers DD_1_1, DD_1_2, and DD_1_3 to light sources LS_1_1, LS_1_2, LS_1_3 LS_1_4, LS_1_5, LS_1_6, LS_1_7, LS_1_8, and LS_1_9. Specifically, device drivers DD_1_1, DD_1_2, and DD_1_3 provide device driver signals DD_S_1_1, DD_S_1_2, and DD_S_1_3, respectively, to light-source selection circuit LSSC_1. Light-source selection circuit LSSC_1 provides light source signal LS_S_1_1 to light source LS_1_1, light source signal LS_S_1_2 to light source LS_1_2, light source signal LS_S_1_3 to light source LS_1_3, light source signal LS_S_1_4 to light source LS_1_4, light source signal LS_S_1_5 to light source LS_1_5, light source signal LS_S_1_6 to light source LS_1_6, light source signal LS_S_1_7 to light source LS_1_7, light source signal LS_S_1_8 to light source LS_1_8, and light source signal LS_S_1_9 to light source LS_1_9. Display 700 would include thousands of light sources, thousands of light-source selection circuits and thousands of device drivers arranged into in the format shown in FIG. 7.

In display 700, each of the light-source selection circuits pairs a device driver with a light source by passing the corresponding device driver signal as the corresponding light source signal during a time interval. The time interval can be a frame time update period, a sub-period of a frame time update period, or multiple frame time update periods. During the next time interval, a different light source is paired with each device driver. Generally, the pairing would follow a fixed pattern the simplest being a sequential order. And in general each device driver should be paired to each light source at about the same frequency. However some embodiments of the present invention may use random pairing of the device drivers and light sources or asymmetric pairings.

In accordance with one embodiment of the present invention, during a first time interval, light-source selection circuit LSSC_1 pairs light source LS_1_1 with data driver DD_1_1, light source LS_1_4 with data driver DD_1_2, and light source LS_1_7 with data driver DD_1_3. Thus, during the first time interval, device driver DD_1_1 drives light source LS_1_1, device driver DD_1_2 drives light source LS_1_4, and device driver DD_1_3 drives light source LS_1_7.

During a second time interval, light-source selection circuit LSSC_1 pairs light source LS_1_2 with data driver DD_1_1, light source LS_1_5 with data driver DD_1_2, and light source LS_1_8 with data driver DD_1_3. Thus, during the second time interval, device driver DD_1_1 drives light source LS_1_2, device driver DD_1_2 drives light source LS_1_5, and device driver DD_1_3 drives light source LS_1_8.

During a third time interval, light-source selection circuit LSSC_1 pairs light source LS_1_3 with data driver DD_1_1, light source LS_1_6 with data driver DD_1_2, and light source LS_1_9 with data driver DD_1_3. Thus, during the third time interval, device driver DD_1_1 drives light source LS_1_3, device driver DD_1_2 drives light source LS_1_6, and device driver DD_1_3 drives light source LS_1_9.

During a fourth time interval, light-source selection circuit LSSC_1 pairs light source LS_1_4 with data driver DD_1_1, light source LS_1_7 with data driver DD_1_2, and light source LS_1_1 with data driver DD_1_3. Thus, during the fourth time interval, device driver DD_1_1 drives light source LS_1_4, device driver DD_1_2 drives light source LS_1_7, and device driver DD_1_3 drives light source LS_1_1.

During a fifth time interval, light-source selection circuit LSSC_1 pairs light source LS_1_5 with data driver DD_1_1, light source LS_1_8 with data driver DD_1_2, and light source LS_1_2 with data driver DD_1_3. Thus, during the fifth time interval, device driver DD_1_1 drives light source LS_1_5, device driver DD_1_2 drives light source LS_1_8, and device driver DD_1_3 drives light source LS_1_2.

During a sixth time interval, light-source selection circuit LSSC_1 pairs light source LS_1_6 with data driver DD_1_1, light source LS_1_9 with data driver DD_1_2, and light source LS_1_3 with data driver DD_1_3. Thus, during the sixth time interval, device driver DD_1_1 drives light source LS_1_6, device driver DD_1_2 drives light source LS_1_9, and device driver DD_1_3 drives light source LS_1_3.

During a seventh time interval, light-source selection circuit LSSC_1 pairs light source LS_1_7 with data driver DD_1_1, light source LS_1_1 with data driver DD_1_2, and light source LS_1_4 with data driver DD_1_3. Thus, during the seventh time interval, device driver DD_1_1 drives light source LS_1_7, device driver DD_1_2 drives light source LS_1_1, and device driver DD_1_3 drives light source LS_1_4.

During an eighth time interval, light-source selection circuit LSSC_1 pairs light source LS_1_8 with data driver DD_1_1, light source LS_1_2 with data driver DD_1_2, and light source LS_1_5 with data driver DD_1_3. Thus, during the eighth time interval, device driver DD_1_1 drives light source LS_1_8, device driver DD_1_2 drives light source LS_1_2, and device driver DD_1_3 drives light source LS_1_5.

During a ninth time interval, light-source selection circuit LSSC_1 pairs light source LS_1_9 with data driver DD_1_1, light source LS_1_3 with data driver DD_1_2, and light source LS_1_6 with data driver DD_1_3. Thus, during the ninth time interval, device driver DD_1_1 drives light source LS_1_9, device driver DD_1_2 drives light source LS_1_3, and device driver DD_1_3 drives light source LS_1_6.

This pattern can continue repeatedly so that in the next time interval (tenth) light-source selection circuit LSSC_1 pairs light source LS_1_1 with data driver DD_1_1, light source LS_1_4 with data driver DD_1_2, and light source LS_1_7 with data driver DD_1_3, which is the same pairing as during frame time interval. However other embodiments of the present invention can use other pairing schemes.

Figure 8:
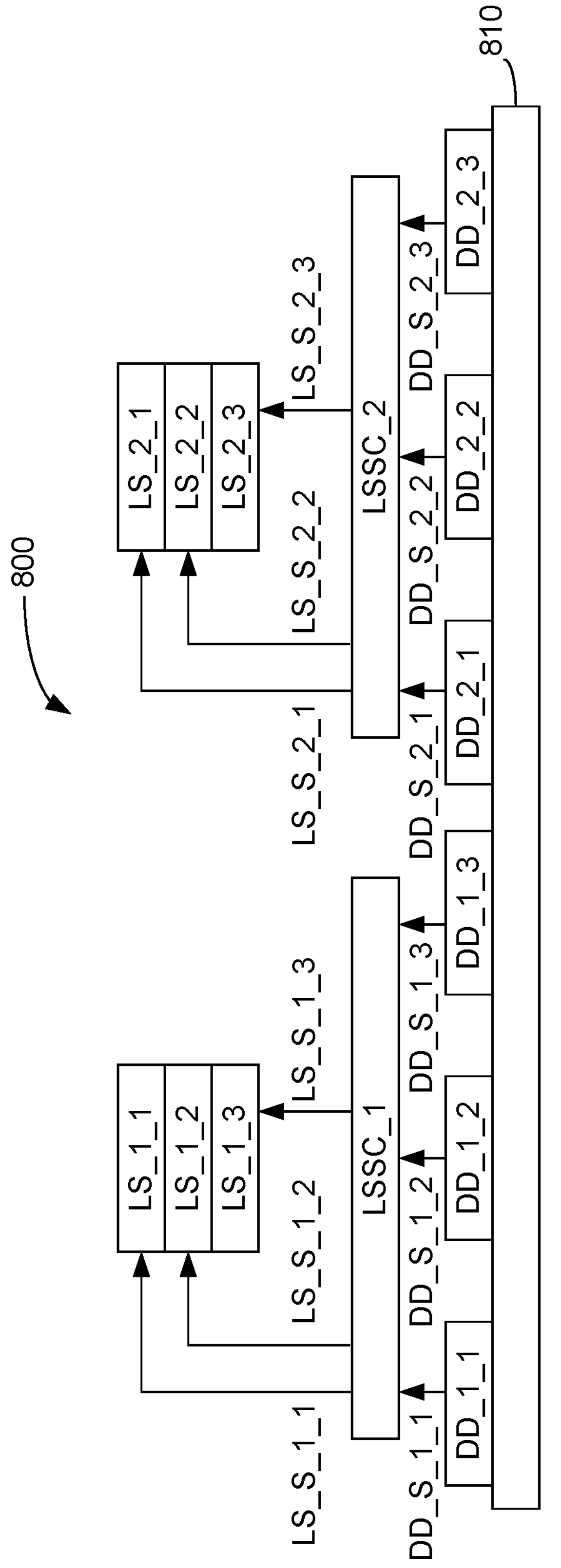
FIG. 8 is an illustration of a portion of display in accordance with one embodiment of the present invention.

FIG. 8 shows a small portion of a display 800 in accordance with one embodiment of the present invention. Display 800 is very similar to display 500 except that the light sources are stacked vertically. In general, stacked light sources are would include different color components that are combined to form a pixel and can have higher pixel density than non-stacked light sources. As illustrated in FIG. 8, display 800 includes a backplane 810, device drivers DD_1_1, DD_1_2, DD_1_3, DD_2_1, DD_2_2, and DD_2_3, light-source selection circuits LSSC_1 and LSSC_2, and light sources LS_1_1, LS_1_2, LS_1_3, LS_2_1, LS_2_2, and LS_2_3. Light-source selection circuit LSSC_1 selectively pairs device drivers DD_1_1, DD_1_2, and DD_1_3 to light sources LS_1_1, LS_1_2, and LS_1_3. Specifically, device drivers DD_1_1, DD_1_2, and DD_1_3 provide device driver signals DD_S_1_1, DD_S_1_2, and DD_S_1_3, respectively to light-source selection circuit LSSC_1. Light-source selection circuit LSSC_1 provides light source signal LS_S_1_1 to light source LS_1_1, light source signal LS_S_1_2 to light source LS_1_2, and light source signal LS_S_1_3 to light source LS_1_3. Similarly, light-source selection circuit LSSC_2 selectively pairs device drivers DD_2_1, DD_2_2, and DD_2_3 to light sources LS_2_1, LS_2_2, and LS_2_3. Specifically, device drivers DD_2_1, DD_2_2, and DD_2_3 provide device driver signals DD_S_2_1, DD_S_2_2, and DD_S_2_3, respectively, to light-source selection circuit LSSC_2. Light-source selection circuit LSSC_2 provides light source signal LS_S_2_1 to light source LS_2_1, light source signal LS_S_2_2 to light source LS_2_2, and light source signal LS_S_2_3 to light source LS_2_3.

As in display 500, in display 800, each of the light-source selection circuits pairs a device driver with a light source by passing the corresponding device driver signal as the corresponding light source signal during a time interval such as a frame time update period. During the next time interval, a different light source is paired with each device driver. Generally, the pairing would follow a fixed pattern the simplest being a sequential order. In addition, each device driver may be paired to each light source for about the same amount of time. However, some embodiments of the present invention may use random pairing of the device drivers and light sources or asymmetrical pairing schemes.

This manner of pairing device drivers with different light sources can mitigate issues caused when the device drivers are not completely identical. For example if a faulty device driver has higher power output, the light source coupled to that device driver may be brighter than intended. By having the faulty device control multiple light sources (although only one at a time) the extra brightness is diffused among the different light sources. Similarly, a faulty device driver that has a lower power output would result in a light source that is dimmer than intended. Again by changing which light source is dimmer each frame update time, the dimmer light source is diffused and would not be as noticeable. Stacked light sources can also be used in arrangements like display 200 (FIG. 2) and display 700 (FIG. 7).

Figure 9:
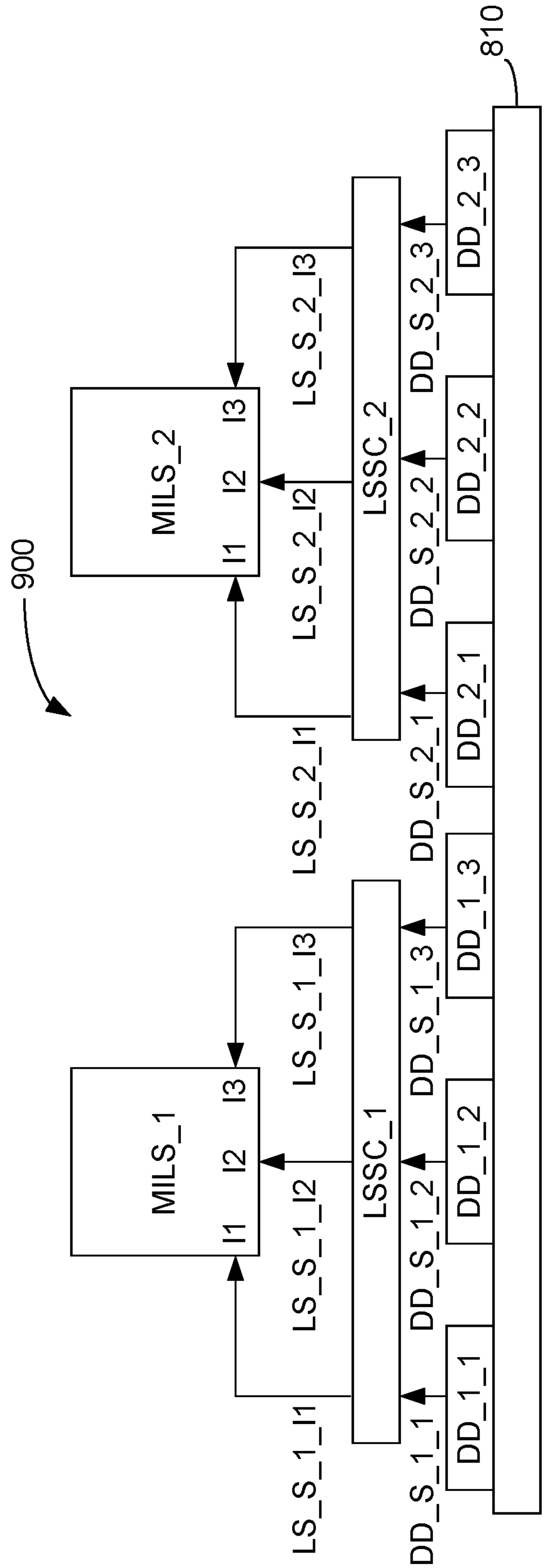
FIG. 9 is an illustration of a portion of display in accordance with one embodiment of the present invention.

FIG. 9 shows a small portion of a display 900 in accordance with one embodiment of the present invention. Display 900 is very similar to display 800 except that a single multi-input light source replaces the three stacked light sources. The multi-input light sources in FIG. 9 include three control inputs. Generally, each control input is used to control a different color component of the multi-input light source. Thus a three input multi-input light source should be a full color light source. As illustrated in FIG. 9, display 900 includes a backplane 910, device drivers DD_1_1, DD_1_2, DD_1_3, DD_2_1, DD_2_2, and DD_2_3, light-source selection circuits LSSC_1 and LSSC_2, and multi-input light sources MILS_1 and MILS_2. Light-source selection circuit LSSC_1 selectively pairs device drivers DD_1_1, DD_1_2, and DD_1_3 to input terminals I1, I2, and I3 of multi-input light source MILS_1. Specifically, device drivers DD_1_1, DD_1_2, and DD_1_3 provide device driver signals DD_S_1_1, DD_S_1_2, and DD_S_1_3, respectively to light-source selection circuit LSSC_1. Light-source selection circuit LSSC_1 provides light source signal LS_S_1_1 to input terminal I1 of multi-input light source MILS_1, light source signal LS_S_1_2 to input terminal I2 of multi-input light source MILS_1, and light source signal LS_S_1_3 to input terminal I3 of multi-input light source MILS_1. Similarly, light-source selection circuit LSSC_2 selectively pairs device drivers DD_2_1, DD_2_2, and DD_2_3 to input terminals I1, I2, and I3 of multi-input light source MILS_1. Specifically, device drivers DD_2_1, DD_2_2, and DD_2_3 provide device driver signals DD_S_2_1, DD_S_2_2, and DD_S_2_3, respectively, to light-source selection circuit LSSC_2. Light-source selection circuit LSSC_2 provides light source signal LS_S_2_1 to input terminal I1 of multi-input light source MILS_2, light source signal LS_S_2_2 to input terminal I2 of multi-input light source MILS_2, and light source signal LS_S_2_3 to input terminal I3 of multi-input light source MILS_2.

Similarly to display 800, in display 900, each of the light-source selection circuits pairs a device driver with an input terminal of a multi-input light source by passing the corresponding device driver signal as the corresponding light source signal during a time interval such as a frame time update period. During the next time interval, a different input terminal of a multi-input light source is paired with each device driver. Generally, the pairing would follow a fixed pattern the simplest being a sequential order. In addition, each device driver may be paired to each input terminal of a multi-input light source for about the same amount of time. However, some embodiments of the present invention may use random pairing of the device drivers and input terminal of multi-input light sources or asymmetrical pairing schemes.

This manner of pairing device drivers with different light sources can mitigate issues caused when the device drivers are not completely identical. For example if a faulty device driver has higher power output, the light component corresponding to the input terminal of the multi-input light source coupled to that device driver may be brighter than intended. By having the faulty device control multiple light components via different corresponding input terminal of the multi-input light sources (although only one at a time) the extra brightness is diffused among the different color components Multi-input light sources can also be used in arrangements like display 200 (FIG. 2) and display 700 (FIG. 7).

Figure 10:
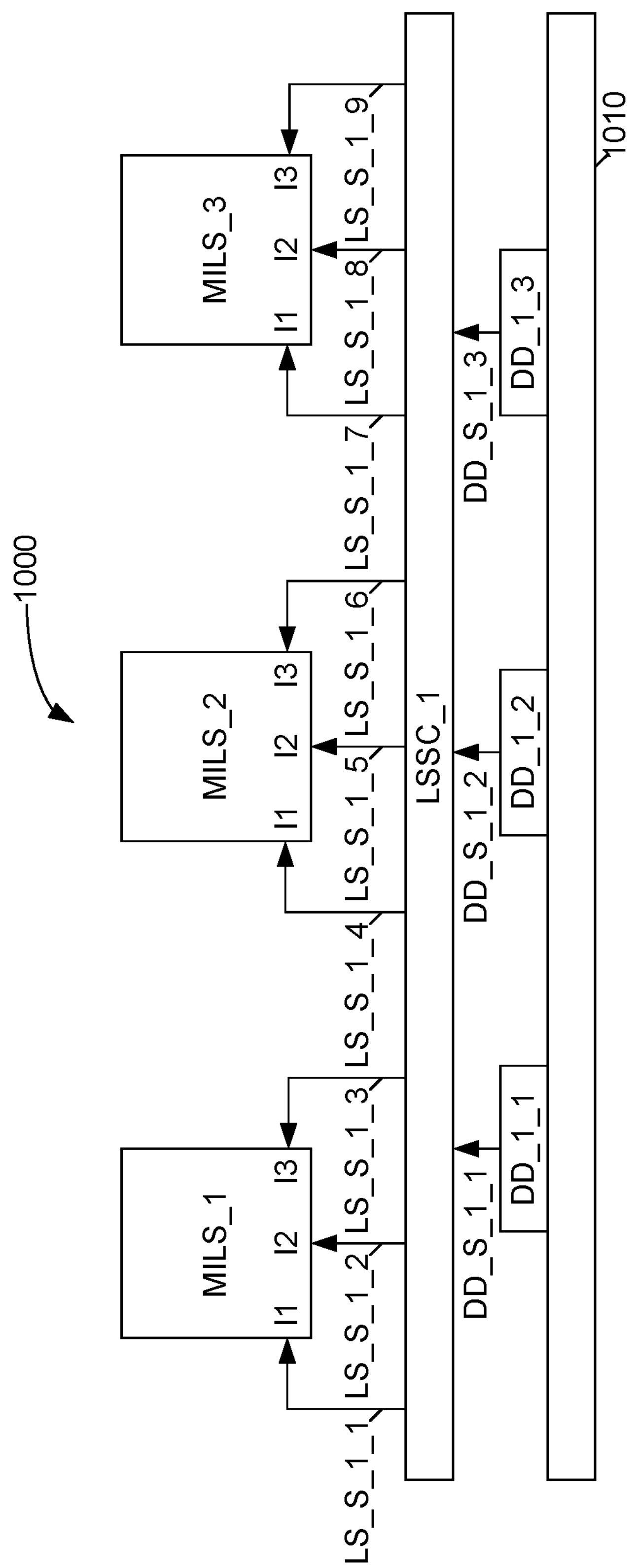
FIG. 10 is an illustration of a portion of display in accordance with one embodiment of the present invention.

FIG. 10 shows a small portion of a display 1000 in accordance with one embodiment of the present invention. Display 1000 is similar to display 700 (FIG. 7) however the nine light sources of display 700 are replaced with three multi-input light sources. As illustrated in FIG. 10, display 1000 includes a backplane 1010, device drivers DD_1_1, DD_1_2, and DD_1_3; light-source selection circuit LSSC_1; and multi-input light source MILS_1, multi-input light source MILS_2, and multi-input light source MILS_1_3. Each multi-input light source has a first input terminal I1, a second input terminal I2, and a third input terminal I3. Light-source selection circuit LSSC_1 selectively pairs device drivers DD_1_1, DD_1_2, and DD_1_3 to input terminals I1, I2, and I3 of multi-input light source MILS_1; input terminals I1, I2, and I3 of multi-input light source MILS_2; and input terminals I1, I2, and I3 of multi-input light source MILS_3. Specifically, device drivers DD_1_1, DD_1_2, and DD_1_3 provide device driver signals DD_S_1_1, DD_S_1_2, and DD_S_1_3, respectively, to light-source selection circuit LSSC_1. Light-source selection circuit LSSC_1 provides light source signal LS_S_1_1 to input terminal I1 of multi-input light source MILS_1, light source signal LS_S_1_2 to input terminal I2 of multi-input light source MILS_1, light source signal LS_S_1_3 to input terminal I3 of multi-input light source MILS_1, light source signal LS_S_1_4 to input terminal I1 multi-input light source MILS_2, light source signal LS_S_1_5 to input terminal I2 of multi-input light source MILS_2, light source signal LS_S_1_6 to input terminal I3 of multi-input light source MILS_2, light source signal LS_S_1_7 to input terminal I1 to multi-input light source MILS_3, light source signal LS_S_1_8 to input terminal I2 of multi-input light source MILS_3, and light source signal LS_S_1_9 to input terminal I3 of multi-input light source MILS_3. Display 1000 would include thousands of multi-input light sources, thousands of light-source selection circuits and thousands of device drivers arranged into in the format shown in FIG. 10.

In display 1000, each of the light-source selection circuits pairs a device driver with an input terminal of a multi-input light source by passing the corresponding device driver signal as the corresponding light source signal during a time interval. The time interval can be a frame time update period, a sub-period of a frame time update period, or multiple frame time update periods. During the next time interval, a different light source is paired with each device driver. Generally, the pairing would follow a fixed pattern the simplest being a sequential order. And in general each device driver should be paired to each light source at about the same frequency. However some embodiments of the present invention may use random pairing of the device drivers and light sources or asymmetric pairings.

In accordance with one embodiment of the present invention, during a first time interval, light-source selection circuit LSSC_1 pairs data driver DD_1_1 with input terminal I1 of multi-input light source MILS_1, data driver DD_1_2 with input terminal I1 of multi-input light source MILS_2, and data driver DD_1_3 with input terminal I3 of multi-input light source MILS_3. Thus, during the first time interval, device driver DD_1_1 drives input terminal I1 of multi-input light source MILS_1, device driver DD_1_2 drives input terminal I1 of multi-input light source MILS_2, and device driver DD_1_3 drives input terminal I1 of multi-input light source MILS_3.

During a second time interval, light-source selection circuit LSSC_1 pairs data driver DD_1_1 with input terminal I2 of multi-input light source MILS_1, data driver DD_1_2 with input terminal I2 of multi-input light source MILS_2, and data driver DD_1_3 with input terminal I2 of multi-input light source MILS_3. Thus, during the second time interval, device driver DD_1_1 drives input terminal I2 of multi-input light source MILS_1, device driver DD_1_2 drives input terminal I2 of multi-input light source MILS_2, and device driver DD_1_3 drives input terminal I2 of multi-input light source MILS_3.

During a third time interval, light-source selection circuit LSSC_1 pairs data driver DD_1_1 with input terminal I2 of multi-input light source MILS_1, data driver DD_1_2 with input terminal I2 of multi-input light source MILS_2, and data driver DD_1_3 with input terminal I2 of multi-input light source MILS_3. Thus, during the second time interval, device driver DD_1_1 drives input terminal I2 of multi-input light source MILS_1, device driver DD_1_2 drives input terminal I2 of multi-input light source MILS_2, and device driver DD_1_3 drives input terminal I2 of multi-input light source MILS_3.

In another embodiment of the present invention during a first time interval, light-source selection circuit LSSC_1 pairs data driver DD_1_1 with input terminal I1 of multi-input light source MILS_1, data driver DD_1_2 with input terminal I2 of multi-input light source MILS_2, and data driver DD_1_3 with input terminal I3 of multi-input light source MILS_3. During a second time interval, light-source selection circuit LSSC_1 pairs data driver DD_1_1 with input terminal I1 of multi-input light source MILS_2, data driver DD_1_2 with input terminal I2 of multi-input light source MILS_3, and data driver DD_1_3 with input terminal I1 of multi-input light source MILS_1. During a third time interval, light-source selection circuit LSSC_1 pairs data driver DD_1_1 with input terminal I1 of multi-input light source MILS_3, data driver DD_1_2 with input terminal I3 of multi-input light source MILS_1, and data driver DD_1_3 with input terminal I1 of multi-input light source MILS_2.

During a fourth time interval, light-source selection circuit LSSC_1 pairs data driver DD_1_1 with input terminal I2 of multi-input light source MILS_1, data driver DD_1_2 with input terminal I3 of multi-input light source MILS_2, and data driver DD_1_3 with input terminal I1 of multi-input light source MILS_3. During a fifth time interval, light-source selection circuit LSSC_1 pairs data driver DD_1_1 with input terminal I2 of multi-input light source MILS_2, data driver DD_1_2 with input terminal I3 of multi-input light source MILS_3, and data driver DD_1_3 with input terminal I2 of multi-input light source MILS_1. During a sixth time interval, light-source selection circuit LSSC_1 pairs data driver DD_1_1 with input terminal I2 of multi-input light source MILS_3, data driver DD_1_2 with input terminal I1 of multi-input light source MILS_1, and data driver DD_1_3 with input terminal I2 of multi-input light source MILS_2.

During a seventh time interval, light-source selection circuit LSSC_1 pairs data driver DD_1_1 with input terminal I3 of multi-input light source MILS_1, data driver DD_1_2 with input terminal I1 of multi-input light source MILS_2, and data driver DD_1_3 with input terminal I2 of multi-input light source MILS_3. During a eighth time interval, light-source selection circuit LSSC_1 pairs data driver DD_1_1 with input terminal I3 of multi-input light source MILS_2, data driver DD_1_2 with input terminal I1 of multi-input light source MILS_3, and data driver DD_1_3 with input terminal I3 of multi-input light source MILS_1. During a ninth time interval, light-source selection circuit LSSC_1 pairs data driver DD_1_1 with input terminal I3 of multi-input light source MILS_3, data driver DD_1_2 with input terminal I2 of multi-input light source MILS_1, and data driver DD_1_3 with input terminal I3 of multi-input light source MILS_2.

This pattern can continue repeatedly so that in the next time interval (tenth) light-source selection circuit LSSC_1 pairs data driver DD_1_1 with input terminal I1 of multi-input light source MILS_1, data driver DD_1_2 with input terminal I2 of multi input light source MILS_2, and data driver DD_1_3 with input terminal I3 of multi-input light source MILS_3, which is the same pairing as during frame time interval. However other embodiments of the present invention can use other pairing schemes.

Figure 11:
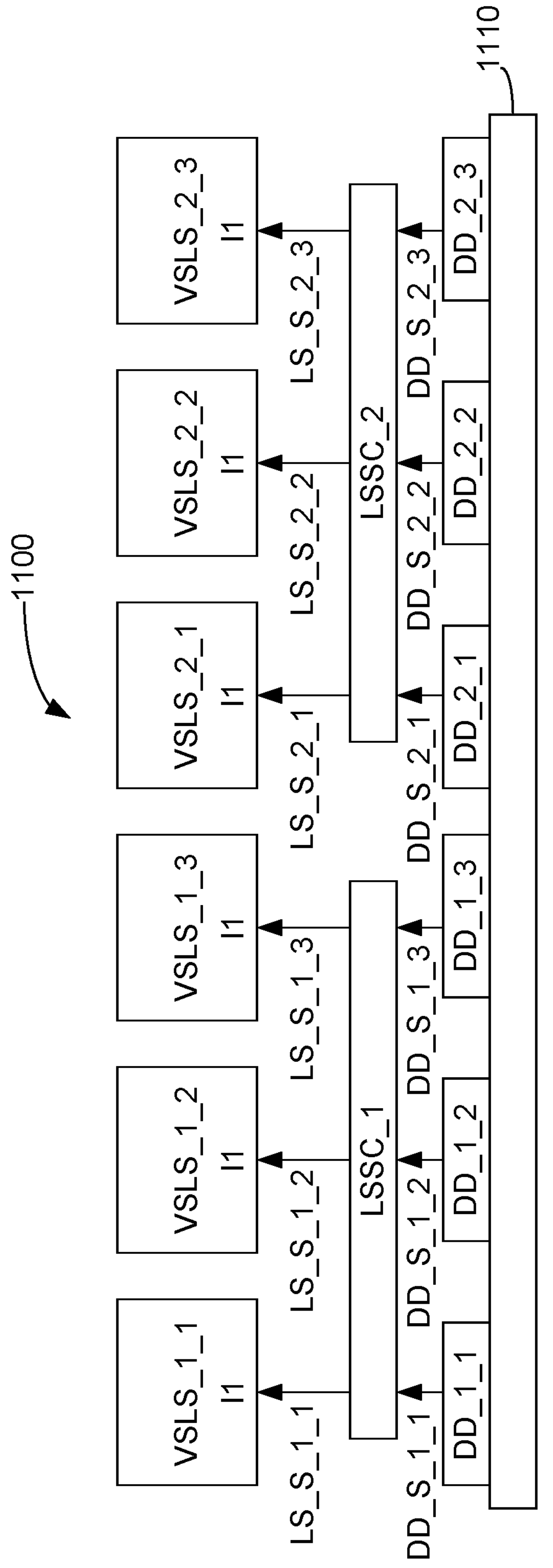
FIG. 11 is an illustration of a portion of display in accordance with one embodiment of the present invention.

FIG. 11 shows a small portion of a display 1100 in accordance with one embodiment of the present invention. Display 1100 is very similar to display 500 except variance selectable light sources are used in place of more conventional light sources. Generally, variance selectable light sources can emit light of different colors based on the signal received at input terminal I1. In some embodiments of the present invention, the color of a variance selectable light sources is controlled by the voltage applied to input terminal I1. Other embodiments may use current values, frequency of an input signal, or even pulse width to control the color of a variance selectable light source. Furthermore, the brightness of the variance selectable light source can be controlled using one of the other factors of the input signal. For example in a specific embodiment of the present invention, voltage is used to control color while current is used to control brightness of a variance selectable light source. In another embodiment, current is used to control color, while frequency is used to control brightness.

As illustrated in FIG. 11, display 1100 includes a backplane 1110, device drivers DD_1_1, DD_1_2, DD_1_3, DD_2_1, DD_2_2, and DD_2_3, light-source selection circuits LSSC_1 and LSSC_2, and variance selectable light sources VSLS_1_1, VSLS_1_2, VSLS_1_3, VSLS_2_1, VSLS_2_2, and VSLS_2_3. Light-source selection circuit LSSC_1 selectively pairs device drivers DD_1_1, DD_1_2, and DD_1_3 to variance selectable light sources VSLS_1_1, VSLS_1_2, and VSLS_1_3. Specifically, device drivers DD_1_1, DD_1_2, and DD_1_3 provide device driver signals DD_S_1_1, DD_S_1_2, and DD_S_1_3, respectively to light-source selection circuit LSSC_1. Light-source selection circuit LSSC_1 provides light source signal LS_S_1_1 to variance selectable light source VSLS_1_1, light source signal LS_S_1_2 to variance selectable light source VSLS_1_2, and light source signal LS_S_1_3 to variance selectable light source VSLS_1_3. Similarly, light-source selection circuit LSSC_2 selectively pairs device drivers DD_2_1, DD_2_2, and DD_2_3 to variance selectable light sources VSLS_2_1, VSLS_2_2, and VSLS_2_3. Specifically, device drivers DD_2_1, DD_2_2, and DD_2_3 provide device driver signals DD_S_2_1, DD_S_2_2, and DD_S_2_3, respectively, to light-source selection circuit LSSC_2. Light-source selection circuit LSSC_2 provides light source signal LS_S_2_1 to variance selectable light source VSLS_2_1, light source signal LS_S_2_2 to variance selectable light source VSLS_2_2, and light source signal LS_S_2_3 to variance selectable light source VSLS_2_3.

As in display 500, in display 1100, each of the light-source selection circuits pairs a device driver with a light source by passing the corresponding device driver signal as the corresponding light source signal during a time interval such as a frame time update period. During the next time interval, a different light source is paired with each device driver. Generally, the pairing would follow a fixed pattern the simplest being a sequential order. In addition, each device driver may be paired to each light source for about the same amount of time. However, some embodiments of the present invention may use random pairing of the device drivers and light sources or asymmetrical pairing schemes.

Figure 12:
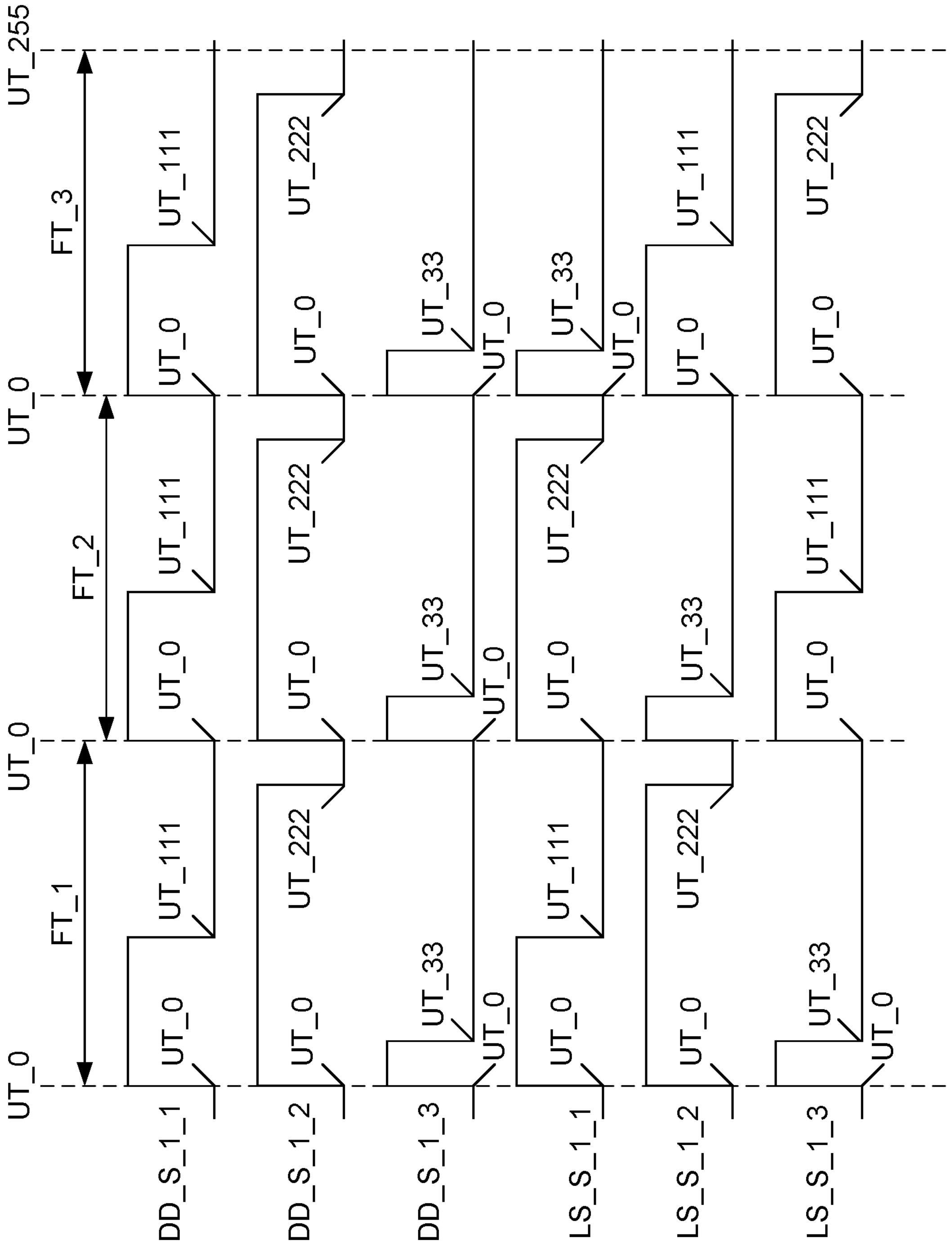
FIG. 12 is timing diagram illustrating the operation of a display in accordance with one embodiment of the present invention.

FIG. 12 shows a timing diagram that can be used for display 1100 in accordance with one embodiment of the present invention. Specifically FIG. 12 shows three frame time periods FT_1, FT_2, and FT_3. In the embodiment of FIG. 12 each frame time period FT is divided into 256 possible update times. For clarity, in FIG. 12, device driver signal DD_S_1_1 transitions to logic high at update time UT_0 and transitions to logic low at update time UT_111 in each of frame time periods FT_1, FT_2, and FT_3. Device driver signal DD_S_1_2 transitions to logic high at update time UT_0 and transitions to logic low at update time UT_222 in each of frame time periods FT_1, FT_2, and FT_3. Device driver signal DD_S_1_3 transitions to logic high at update time UT_0 and transitions to logic low at update time UT_33 in each of frame time periods FT_1, FT_2, and FT_3

During frame time period FT_1, light-source selection circuit LSSC_1 pairs variance selectable light source VSLS_1_1 with data driver DD_1_1, variance selectable light source VSLS_1_2 with data driver DD_1_2, and variance selectable light source VSLS_1_3 with data driver DD_1_3. Thus as shown in FIG. 12, during frame time period FT_1, light source signal LS_S_1_1 transitions to logic high at update time UT_0 and transitions to logic low at update time UT_111 just as device driver signal DD_S_1_1; light source signal LS_S_1_2 transitions to logic high at update time UT_0 and transitions to logic low at update time UT_222 just as device driver signal DD_S_1_2; and light source signal LS_S_1_3 transitions to logic high at update time UT_0 and transitions to logic low at update time UT_33 just as device driver signal DD_S_1_3.

During frame time period FT_2, light-source selection circuit LSSC_1 pairs variance selectable light source VSLS_1_1 with data driver DD_1_2, variance selectable light source VSLS_1_2 with data driver DD_1_3, and variance selectable light source VSLS_1_3 with data driver DD_1_1. Thus as shown in FIG. 12 during frame time period FT_2, light source signal LS_S_1_1 transitions to logic high at update time UT_0 and transitions to logic low at update time UT_222 just as device driver signal DD_S_1_2; light source signal LS_S_1_2 transitions to logic high at update time UT_0 and transitions to logic low at update time UT_33 just as device driver signal DD_S_1_3; and light source signal LS_S_1_3 transitions to logic high at update time UT_0 and transitions to logic low at update time UT_111 just as device driver signal DD_S_1_1.

During frame time period FT_3, light-source selection circuit LSSC_1 pairs variance selectable light source VSLS_1_1 with data driver DD_1_3, variance selectable light source VSLS_1_2 with data driver DD_1_1, and variance selectable light source VSLS_1_3 with data driver DD_1_2. Thus as shown in FIG. 12, during frame time period FT_3, light source signal LS_S_1_1 transitions to logic high at update time UT_0 and transitions to logic low at update time UT_33 just as device driver signal DD_S_1_3; light source signal LS_S_1_2 transitions to logic high at update time UT_0 and transitions to logic low at update time UT_111 just as device driver signal DD_S_1_1; and light source signal LS_S_1_3 transitions to logic high at update time UT_0 and transitions to logic low at update time UT_222 just as device driver signal DD_S_1_2.

This pattern can continue repeatedly so that in frame time period FT_4 (not shown) light-source selection circuit LSSC_1 pairs variance selectable light source VSLS_1_1 with data driver DD_1_1, variance selectable light source VSLS_1_2 with data driver DD_1_2, and variance selectable light source VSLS_1_3 with data driver DD_1_3, which is the same pairing as during frame time period FT_1. However other embodiments of the present invention can use other pairing schemes. Furthermore, the time interval of pairing shown in FIG. 12 is one frame time period. However other embodiments of the present invention can use different time interval of pairings. For example some embodiments of the present invention may use sub-periods of a frame time period like in FIG. 3 or multiple sub-periods in a frame time period like in FIG. 4. Still other embodiments of the present invention may keep the same device driver/light source pairing for multiple time intervals before switching This manner of pairing device drivers with different light sources can mitigate issues caused when the device drivers are not completely identical. For example if a faulty device driver has higher power output, the light source coupled to that device driver may be brighter than intended. By having the faulty device control multiple light sources (although only one at a time) the extra brightness is diffused among the different light sources. Similarly, a faulty device driver that has a lower power output would result in a light source that is dimmer than intended. Again by changing which light source is dimmer each frame update time, the dimmer light source is diffused and would not be as noticeable. Variance selectable light sources can also be used in arrangements like display 200 (FIG. 2) and display 700 (FIG. 7).

Figure 13:
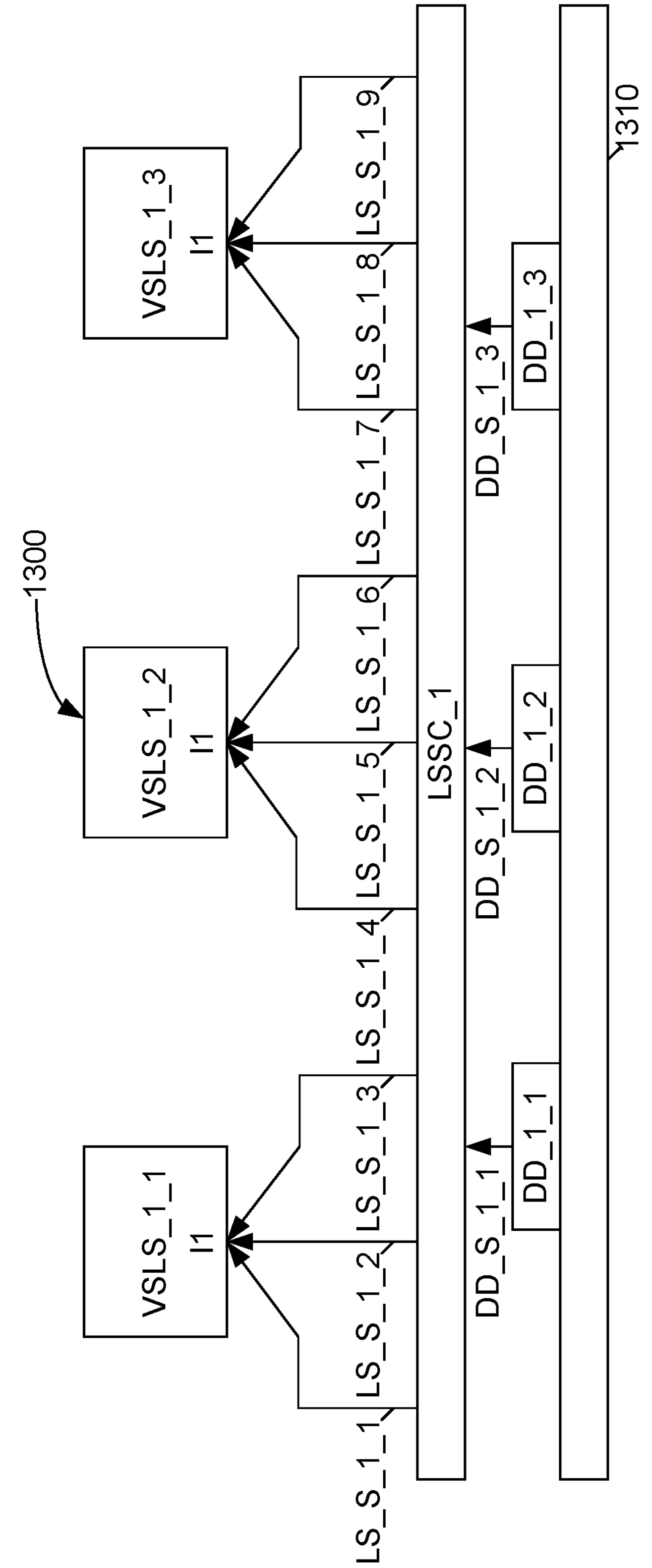
FIG. 13 is an illustration of a portion of display in accordance with one embodiment of the present invention.

FIG. 13 shows a small portion of a display 1300 in accordance with one embodiment of the present invention. Display 1300 is similar to display 1000 (FIG. 10) however the multi-input light sources of FIG. 10 are replaced with variance selectable light sources. As illustrated in FIG. 13, display 1300 includes a backplane 1310, device drivers DD_1_1, DD_1_2, and DD_1_3; light-source selection circuit LSSC_1; and variance selectable light source VSLS_1_1, variance selectable light source VSLS_1_2, and variance selectable light source VSLS_1_3. Each variance selectable light source has an input terminal I1. Light-source selection circuit LSSC_1 selectively pairs device drivers DD_1_1, DD_1_2, and DD_1_3 to input terminal I1 of variance selectable light source VSLS_1_1; input terminal I1 of variance selectable light source VSLS_1_2; and input terminal I1 of variance selectable light source VSLS_1_3. Specifically, device drivers DD_1_1, DD_1_2, and DD_1_3 provide device driver signals DD_S_1_1, DD_S_1_2, and DD_S_1_3, respectively, to light-source selection circuit LSSC_1. Light-source selection circuit LSSC_1 provides light source signal LS_S_1_1, light source signal LS_S_1_2, and light source signal LS_S_1_3 to input terminal I1 of variance selectable light source VSLS_1_1; light source signal LS_S_1_4, light source signal LS_S_1_5, and light source signal LS_S_1_6 to input terminal I1 of variance selectable light source VSLS_1_2; and light source signal LS_S_1_7, light source signal LS_S_1_8, and light source signal LS_S_1_9 to input terminal I1 of variance selectable light source VSLS_1_3. Display 1300 would include thousands of variance selectable light sources, thousands of light-source selection circuits and thousands of device drivers arranged into in the format shown in FIG. 13.

In display 1300, each of the light-source selection circuits pairs a device driver with a variance selectable light source by passing the corresponding device driver signal as the corresponding light source signal during a time interval. In display 1300, multiple device drivers may be paired with a single variance selectable light source. Thus, a single variance selectable light source can receive multiple light source signals at input terminal I1 of the variance selectable light source. The time interval of the pairing can be a frame time update period, a sub-period of a frame time update period, or multiple frame time update periods. During the next time interval, the pairing of device drivers and variance selectable light sources changes.

In accordance with one embodiment of the present invention, during a first time interval, light-source selection circuit LSSC_1 pairs data driver DD_1_1, data driver DD_1_2, and data driver DD_1_3 with input terminal I1 of variance selectable light source VSLS_1_1. Thus, during the first time interval, device driver DD_1_1, device driver DD_1_2, and device driver DD_1_3 drives input terminal I1 of variance selectable light source VSLS_1_1, through light source signal LS_S_1_1, light source signal LS_S_1_2, and light source signal LS_S_1_3, respectively. During a second time interval, light-source selection circuit LSSC_1 pairs data driver DD_1_1, data driver DD_1_2, and data driver DD_1_3 with input terminal I1 of variance selectable light source VSLS_1_2. Thus, during the second time interval, device driver DD_1_1, device driver DD_1_2, and device driver DD_1_3 drives input terminal I1 of variance selectable light source VSLS_2, through light source signal LS_S_1_4, light source signal LS_S_1_5, and light source signal LS_S_1_6, respectively. During a third time interval, light-source selection circuit LSSC_1 pairs data driver DD_1_1, data driver DD_1_2, and data driver DD_1_3 with input terminal I1 of variance selectable light source VSLS_3. Thus, during the third time interval, device driver DD_1_1, device driver DD_1_2, and device driver DD_1_3 drives input terminal I1 of variance selectable light source VSLS_3, through light source signal LS_S_1_7, light source signal LS_S_1_8, and light source signal LS_S_1_9, respectively.

Figure 14:
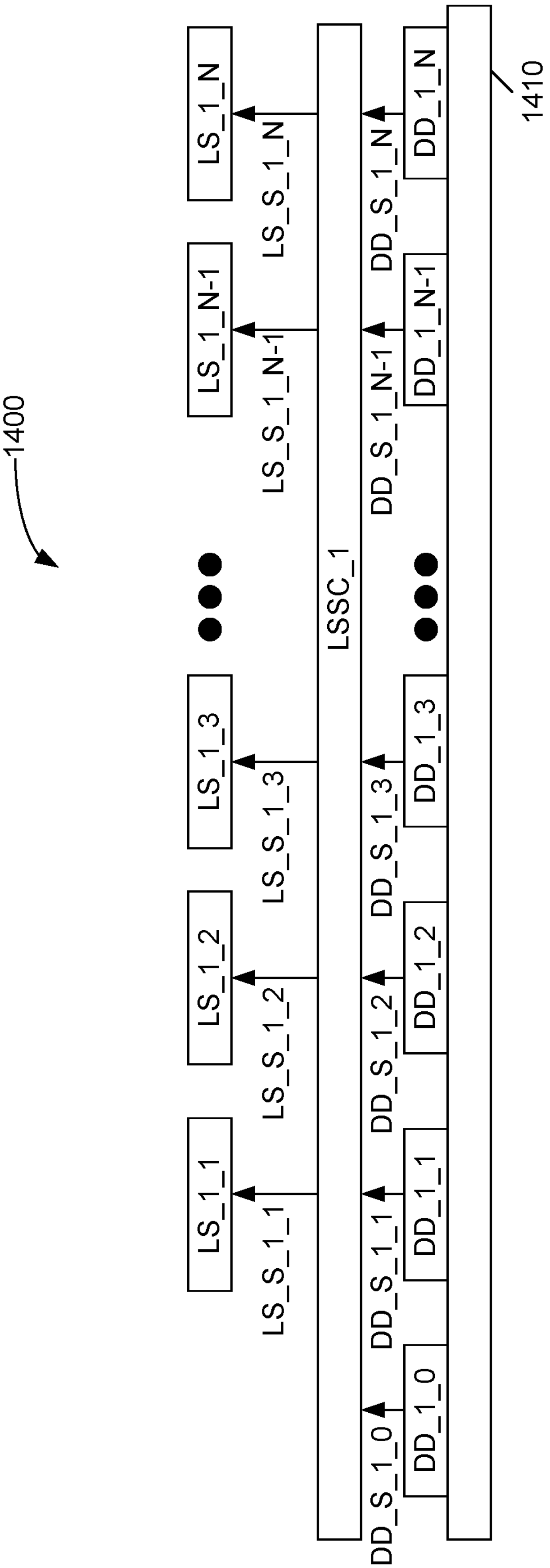
FIG. 14 is an illustration of a portion of display in accordance with one embodiment of the present invention.

FIG. 14 shows a small portion of a display 1400 in accordance with one embodiment of the present invention. As illustrated in FIG. 14, display 1400 includes a backplane 1410, and N+1 (where N is an integer) device drivers DD_1_0, DD_1_1, DD_1_2, DD_1_3, . . . DD_1_N−1, and DD_1_N; light-source selection circuit LSSC_1; and N light sources LS_1_1, LS_1_2, LS_1_3, . . . LS_1_N−1, and LS_1_N. In one embodiment of the present invention, Light sources LS_1_1 through LS_1_N could form one row of display 1400. Light-source selection circuit LSSC_1 selectively pairs device drivers DD_1_0 through DD_1_N to light sources LS_1_1 through LS_1_N. However, since there is one more device driver than light sources, one device driver is not paired during each time interval. Specifically, device drivers DD_1_0 through DD_1_N provide device driver signals DD_S_1_1, through DD_S_1_N, respectively to light-source selection circuit LSSC_1. Light-source selection circuit LSSC_1 provides light source signal LS_S_1_1 to light source LS_1_1, light source signal LS_S_1_2 to light source LS_1_2, . . . and light source signal LS_S_1_N to light source LS_1_N.

In display 1400, each of the light-source selection circuits pairs a device driver with a light source by passing the corresponding device driver signal as the corresponding light source signal during a time interval such as a frame time update period. During the next time interval, a different light source is paired with each device driver. Generally, the pairing would follow a fixed pattern the simplest being a sequential order. In addition, each device driver may be paired to each light source for about the same amount of time. However, some embodiments of the present invention may use random pairing of the device drivers and light sources or asymmetrical pairing schemes. In a particular embodiment of the present invention, during even numbered time intervals each device driver DD_1_X (where X is an integer from 0 to N−1) is paired with light source LS_1_X+1. Device driver DD_1_N is not paired during even numbered time intervals. During odd numbered time intervals, each device driver DD_1_Y (where Y is an integer form 1 to N) is paired with light source LS_1_Y. Device driver DD_1_0 is not paired during even numbered time intervals.

This manner of pairing device drivers with different light sources can mitigate issues caused when the device drivers are not completely identical. For example if a faulty device driver has higher power output, the light source coupled to that device driver may be brighter than intended. By having the faulty device control multiple light sources (although only one at a time) the extra brightness is diffused among the different light sources. Similarly, a faulty device driver that has a lower power output would result in a light source that is dimmer than intended. Again by changing which light source is dimmer each frame update time, the dimmer light source is diffused and would not be as noticeable.

As mentioned above, in one embodiment of the present invention, light sources LS_1_1 through LS_1_N could be a row of a display. In other embodiments of the present invention, the N light sources can form other portions of the display. In a particular embodiment light sources LS_1_1 through LS_1_N include all the pixels of a display. The principles of FIG. 1400 can be expanded to have display drivers alternating between P pixels by including P extra drivers. For example N+2 device drivers DD_0 through DD N+1 can be used to drive N light sources LS_1 through LS_N where each device driver is paired with one of three light sources depending on the time interval. Specifically during a first time interval device driver DD_X (where X is an integer from 2 to N+1) is paired with light source LS_X−1. During a second time interval device driver DD_Y (where Y is an integer from 1 to N) is paired with light source LS_Y. During a third time interval device driver DD_Z (Where Z is an integer from zero to N−1) is paired with light source LS_Z+1.

In the various embodiments of the present invention, novel structures and methods have been described for creating high resolution displays in which multiple light sources share a device driver. The various embodiments of the structures and methods of this invention that are described above are illustrative only of the principles of this invention and are not intended to limit the scope of the invention to the particular embodiment described. For example, in view of this disclosure those skilled in the art can define other light sources, stacked light sources, multi input light sources, variance selectable light sources, device drivers, light-source selection circuits, time intervals, frame time periods, sub-periods, and so forth, and use these alternative features to create a method or system according to the principles of this invention. Thus, the invention is limited only by the following claims.

What is claimed is:

1. A display comprising:
a first device driver;
a second device driver;
a third device driver;
a first light source;
a second light source;
a third light source;
a first light-source selection circuit coupled to the first device driver, the second device driver, the third device driver, the first light source, the second light source, and the third light source;
wherein the first light-source selection circuit is configured to pair the first device driver with the first light source during a first time interval;
wherein the first light-source selection circuit is configured to pair the first device driver with the second light source during a second time interval;
wherein the first light-source selection circuit is configured to pair the first device driver with the third light source during a third time interval;
wherein the first light-source selection circuit is configured to pair the second device driver with the second light source during the first time interval;
wherein the first light-source selection circuit is configured to pair the third device driver with the third light source during the first time interval;
wherein the first light-source selection circuit is configured to pair the second device driver with the third light source during the second time interval;
wherein the first light-source selection circuit is configured to pair the third device driver with the first light source during the second time interval;
wherein the first light-source selection circuit is configured to pair the second device driver with the first light source during the third time interval;
wherein the first light-source selection circuit is configured to pair the third device driver with the second light source during the third time interval.

2. The display of claim 1, wherein:
the first time interval is a first sub-period of a frame time period;
the second time interval is a second sub-period of the frame time period; and
the third time interval is a third sub-period of the frame time period.

3. The display of claim 1, wherein:
the first light source is a first color;
the second light source is a second color;
the third light source is a third color.

4. The display of claim 3, wherein the first color is red, the second color is green, and the third color is blue.

5. The display of claim 1, further comprising:
a fourth light source coupled to the first light-source selection circuit;
a fifth light source coupled to the first light-source selection circuit;
a sixth light source coupled to the first light-source selection circuit;
a seventh light source coupled to the first light-source selection circuit;
a eighth light source coupled to the first light-source selection circuit; and
a ninth light source coupled to the first light-source selection circuit.

6. The display of claim 5, wherein:
the first light-source selection circuit is configured to pair the first device driver with the fourth light source, the fifth light source, the sixth light source, the seventh light source, the eighth light source, and the ninth light source during a fourth time interval, a fifth time interval, a sixth time interval, a seventh time interval, an eighth time interval, and a ninth time interval, respectively;
the first light-source selection circuit is configured to pair the second device driver with the fourth light source, the fifth light source, the sixth light source, the seventh light source, the eighth light source, the ninth light source, the first light source, the second light source, and the third light source during the first time interval, the second time interval, the third time interval, the fourth time interval, the fifth time interval, the sixth time interval, the seventh time interval, the eighth time interval, and the ninth time interval, respectively; and
the first light-source selection circuit is configured to pair the third device driver with the seventh light source, the eighth light source, the ninth light source, the first light source, the second light source, the third light source, the fourth light source, the fifth light source, and the sixth light source during the first time interval, the second time interval, the third time interval, the fourth time interval, the fifth time interval, the sixth time interval, the seventh time interval, the eighth time interval, and the ninth time interval, respectively.

7. The display of claim 1, wherein the second light source is stacked on the first light source and third light source is stacked on the second light source.

8. A display comprising:
a first device driver;
a second device driver;
a first light source;
a second light source;
a third light source;
a fourth light source;
a first light-source selection circuit coupled to the first device driver, the second device driver, the first light source, the second light source, the third light source, and the fourth light source;
wherein the first light-source selection circuit is configured to pair the first device driver with the first light source during a first time interval; and
wherein the first light-source selection circuit is configured to pair the first device driver with the second light source during a second time interval;
wherein the first light-source selection circuit is configured to pair the first device driver with the third light source during a third time interval;
wherein the first light-source selection circuit is configured to pair the first device driver with the fourth light source during a fourth time interval; and
wherein the first light-source selection circuit is configured to pair the second device driver with the third light source, the fourth light source, the first light source, and the second light source, during the first time interval, the second time interval, the third time interval and the fourth time interval, respectively.

9. The display of claim 1, wherein the first light source is a light emitting diode.

10. The display of claim 1, wherein the first light source is a micro light emitting diode.

11. The display of claim 1, wherein the first light source is an organic light emitting diode.

12. A display comprising:

a first device driver;

a second device driver;

a first light source of a first color;

a second light source of a second color;

a third light source of the second color;

a fourth light source of a third color;

a fifth light source of the third color;

a sixth light source of the first color;

a first light-source selection circuit coupled to the first device driver, the first light source, the second light source, and the fifth light source;

a second light-source selection circuit coupled to the second device driver, the third light source, the fourth light source, and the sixth light source;

wherein the first light-source selection circuit is configured to pair the first device driver with the first light source during a first time interval;

wherein the first light-source selection circuit is configured to pair the first device driver with the second light source during a second time interval;

wherein the first light-source selection circuit is configured to pair the first device driver with the fifth light source during a third time interval;

wherein the second light-source selection circuit is configured to pair the second device driver with the third light source during the first time interval; and wherein the second light-source selection circuit is configured to pair the second device driver with the fourth light source during the second time interval; and wherein the second light-source selection circuit is configured to pair the second device driver with the sixth light source during the third time interval.

13. The display of claim 12 wherein:

the first time interval is a first sub-period of a frame time period;

the second time interval is a second sub-period of the frame time period; and the third time interval is a third sub-period of the frame time period.

14. The display of claim 1, wherein the second light source is stacked on the first light source.

15. A display comprising:

a first device driver;

a second device driver;

a third device driver;

a first multi-input light source having a first input terminal, a second input terminal, and a third input terminal;

a first light-source selection circuit coupled to the first device driver, the second device driver, the third device driver, the first input terminal of the first multi-input light source, the second input terminal of the first multi-input light source, and the third input terminal of the first multi-input light source;

wherein the first light-source selection circuit is configured to pair the first device driver with the first input terminal of the first multi-input light source during a first time interval;

wherein the first light-source selection circuit is configured to pair the first device driver with the second input terminal of the first multi-input light source during a second time interval;

wherein the first light-source selection circuit is configured to pair the first device driver with the third input terminal of the first multi-input light source during a third time interval;

wherein the first light-source selection circuit is configured to pair the second device driver with the second input terminal of the first multi-input light source during the first time interval;

wherein the first light-source selection circuit is configured to pair the second device driver with the third input terminal of the first multi-input light source during the second time interval;

wherein the first light-source selection circuit is configured to pair the second device driver with the first input terminal of the first multi-input light source during the third time interval;

wherein the first light-source selection circuit is configured to pair the third device driver with the third input terminal of the first multi-input light source during the first time interval;

wherein the first light-source selection circuit is configured to pair the third device driver with the first input terminal of the first multi-input light source during the second time interval; and wherein the first light-source selection circuit is configured to pair the third device driver with the second input terminal of the first multi-input light source during the third time interval.

16. The display of claim 15, wherein:

the first time interval is a first sub-period of a frame time period;

the second time interval is a second sub-period of the frame time period; and the third time interval is a third sub-period of the frame time period.

17. The display of claim 15, further comprising:

a fourth device driver;

a second multi-input light source having a first input terminal, a second input terminal, and a third input terminal; and a second light-source selection circuit coupled to the fourth device driver, the first input terminal of the second multi-input light source, the second input terminal of the second multi-input light source, and the third input terminal of the third multi-input light source.

18. A display comprising:

a first device driver;

a second device driver;

a third device driver;

a first multi-input light source having a first input terminal, a second input terminal, and a third input terminal;

a second multi-input light source having a first input terminal, a second input terminal, and a third input terminal;

a third multi-input light source having a first input terminal, a second input terminal, and a third input terminal;

a first light-source selection circuit coupled to the first device driver, the second device driver, the third device driver, the first input terminal of the first multi-input light source, the first input terminal of the second multi-input light source, the first input terminal of the third multi-input light source, the second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source;

wherein the first light-source selection circuit is configured to pair the first device driver with the first input terminal of the first multi-input light source during a first time interval;

wherein the first light-source selection circuit is configured to pair the first device driver with the first input terminal of the second multi-input light source during a second time interval;

wherein the first light-source selection circuit is configured to pair the first device driver with the first input terminal of the third multi-input light source during a third time interval; and wherein the first light-source selection circuit is configured to pair the first device driver with the second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source during a fourth time interval, a fifth time interval, the sixth time interval, a seventh time interval, an eighth time interval, and a ninth time interval, respectively.

19. The display of claim 18:

wherein the first light-source selection circuit is configured to pair the second device driver with the second input terminal of the first multi-input light source during the first time interval;

wherein the first light-source selection circuit is configured to pair the second device driver with the second input terminal of the second multi-input light source during the second time interval; and wherein the first light-source selection circuit is configured to pair the second device driver with the second input terminal of the third multi-input light source during the third time interval.

20. The display of claim 19:

wherein the first light-source selection circuit is configured to pair the third device driver with the third input terminal of the first multi-input light source during the first time interval;

wherein the first light-source selection circuit is configured to pair the third device driver with the third input terminal of the second multi-input light source during the second time interval; and wherein the first light-source selection circuit is configured to pair the third device driver with the third input terminal of the third multi-input light source during the third time interval.

21. The display of claim 18, wherein the first light-source selection circuit is configured to pair the second device driver with the first input terminal of the first multi-input light source, the first input terminal of the second multi-input light source, the first input terminal of the third multi-input light source, second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source during the seventh time interval, the eighth time interval, the ninth time interval, the first time interval, the second time interval, the third time interval, the fourth timer interval, the fifth time interval, and the sixth time interval, respectively; and wherein the first light-source selection circuit is configured to pair the third device driver with the first input terminal of the first multi-input light source, the first input terminal of the second multi-input light source, the first input terminal of the third multi-input light source, second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source during the fourth timer interval, the fifth time interval, the sixth time interval, the seventh time interval, the eighth time interval, the ninth time interval, the first time interval, the second time interval, and the third time interval, respectively.

22. The display of claim 18, wherein the first light-source selection circuit is configured to pair the second device driver with the first input terminal of the first multi-input light source, the first input terminal of the second multi-input light source, the first input terminal of the third multi-input light source, second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source during the sixth time interval, the seventh time interval, the eighth time interval, the ninth time interval, the first time interval, the second time interval, the third time interval, the fourth timer interval, and the fifth time interval, respectively; and wherein the first light-source selection circuit is configured to pair the third device driver with the first input terminal of the first multi-input light source, the first input terminal of the second multi-input light source, the first input terminal of the third multi-input light source, second input terminal of the first multi-input light source, the second input terminal of the second multi-input light source, the second input terminal of the third multi-input light source, the third input terminal of the first multi-input light source, the third input terminal of the second multi-input light source, and the third input terminal of the third multi-input light source during the second time interval, the third time interval, the fourth timer interval, the fifth time interval, the sixth time interval, the seventh time interval, the eighth time interval, the ninth time interval, and the first time interval, respectively.

23. The embodiment of claim 1, wherein the first light source is a first variance selectable light source and the second light source is a second variance selectable light source.

* * * * *